United States Patent
Koski et al.

(10) Patent No.: US 12,037,259 B2
(45) Date of Patent: Jul. 16, 2024

(54) METAL INTERCALATION IN LAYERED MoS₂ DEVICES FOR ENHANCED PHOTODETECTION

(71) Applicants: The Regents of the University of California, Oakland, CA (US); BAR-ILAN UNIVERSITY, Ramat Gan (IL)

(72) Inventors: Kristie Koski, Davis, CA (US); Doron Naveh, Petah-Tikva (IL); Chen Stern, Kiryat Ono (IL); Avraham Twitto, Jerusalem (IL)

(73) Assignees: The Regents of the University of California, Oakland, CA (US); BAR-ILAN UNIVERSITY, Ramat Gan (IL)

(*) Notice: Subject to any disclaimer, the term of this patent is extended or adjusted under 35 U.S.C. 154(b) by 0 days.

(21) Appl. No.: 18/312,840

(22) Filed: May 5, 2023

(65) Prior Publication Data

US 2023/0357044 A1    Nov. 9, 2023

Related U.S. Application Data

(60) Provisional application No. 63/364,305, filed on May 6, 2022.

(51) Int. Cl.
  *C01G 39/06*    (2006.01)
  *G01J 5/10*     (2006.01)
  *G01J 5/00*     (2022.01)
(52) U.S. Cl.
  CPC ........... *C01G 39/06* (2013.01); *G01J 5/10* (2013.01); *C01P 2002/54* (2013.01);
  (Continued)

(58) Field of Classification Search
  CPC .. H01B 1/00; H01B 1/10; H01M 4/02; C01G 39/06; H01L 31/0272
  See application file for complete search history.

(56) References Cited

U.S. PATENT DOCUMENTS

| 10,680,403 | B2* | 6/2020 | Cronin | H01S 5/02453 |
| 2022/0325432 | A1* | 10/2022 | Jariwala | B01J 35/0013 |
| 2023/0234003 | A1* | 7/2023 | Liu | B01D 67/0079 |
| | | | | 210/653 |

FOREIGN PATENT DOCUMENTS

WO    2012/111009 A2    8/2012

OTHER PUBLICATIONS

Agrawal et al "Interfacial study of vertically aligned n-type MoS2 flakes heterojunction with p-type Cu—Zn—Sn—S for self-powered, fast and high performance broadband photodetector", Applied Surface Science 514 (2020) 145901.*

(Continued)

*Primary Examiner* — Mark Kopec
(74) *Attorney, Agent, or Firm* — McKee, Voorhees & Sease, PLC

(57) ABSTRACT

The present disclosure relates to layered 2D MoS₂ nanostructures wherein light-matter interactions are enhanced by intercalation with transition metal atoms and/or post-transition metal atoms, specifically Cu and/or Sn. Photodetectors comprising Cu and/or Sn intercalated 2D MoS₂ nanostructures amplify the response in the near-infrared for devices based on 2D MoS₂.

20 Claims, 18 Drawing Sheets
(18 of 18 Drawing Sheet(s) Filed in Color)

(52) U.S. Cl.
CPC ...... *C01P 2002/77* (2013.01); *C01P 2002/78* (2013.01); *C01P 2002/82* (2013.01); *C01P 2002/85* (2013.01); *C01P 2002/88* (2013.01); *C01P 2004/04* (2013.01); *C01P 2006/40* (2013.01); *G01J 2005/0077* (2013.01)

(56) References Cited

OTHER PUBLICATIONS

Wang et al "Transition-metal doped edge sites in vertically aligned MoS2 catalysts for enhanced hydrogen evolution", Nano Research 2015, 8(2): 566-575.*

Huang et al "Facile chemical-vapour-deposition synthesis of vertically aligned co-doped MoS2 nanosheets as an efficient catalyst for triiodide reduction and hydrogen evolution reaction", Journal of Catalysis 373 (2019) 250-259.*

Guzman et al., "First principles investigation of copper and silver intercalated molybdenum disulfide," Journal of Applied Physics, 2017, vol. 121, No. 055703, 10 pages.

Stern et al., "Enhancing Light-Matter Interactions in MoS2 by Copper Intercalation," Advanced Materials, 2021, vol. 33, No. 2008779, 9 pages.

Taffelli et al., "MoS2 Based Photodetectors: A Review," Sensors, 2021, vol. 21, No. 2758, 22 pages.

Wan et al., "Tuning two-dimensional nanomaterials by intercalation: materials, properties and applications," Chemical Society Reviews, 2016, vol. 45, pp. 6742-6765.

* cited by examiner

METAL INTERCALATION IN LAYERED MoS₂ DEVICES FOR ENHANCED PHOTODETECTION

CROSS-REFERENCE TO RELATED APPLICATIONS

This application claims priority under 35 U.S.C. § 119 to provisional application Ser. No. 63/364,305, filed May 6, 2022, herein incorporated by reference in its entirety.

TECHNICAL FIELD

The present disclosure relates to layered 2D $MoS_2$ nanostructures wherein light-matter interactions are enhanced by intercalation with transition metal atoms and/or post-transition metal atoms, specifically Cu and/or Sn.

BACKGROUND

Molybdenum sulfide ($MoS_2$) is a transition metal dichalcogenide semiconductor material. The crystal structure of $MoS_2$ takes the form of a hexagonal plane of S atoms on either side of a hexagonal plane of Mo atoms. $MoS_2$ planes may stack on top of one another with strong covalent bonds between the Mo and S atoms, with weaker vdW forces holding the layers together, allowing $MoS_2$ to be separated into 2D sheets. Due, in part, to its direct bandgap, 2D $MoS_2$ devices have been utilized in optical sensors such as photodetectors. 2D $MoS_2$ photodiodes exhibit photoresponsivity in the visible region, but weaker absorption in the IR spectral region. Accordingly, there remains opportunity to further intensify light-matter interactions and amplify the response in the near-infrared (NIR) for devices based on 2D $MoS_2$ structures.

BRIEF SUMMARY

The present disclosure relates to a photodetector comprising 2D vertically-aligned $MoS_2$ layers, wherein a van der Waals (vdW) gap of at least two layers of the $MoS_2$ is intercalated with one or more transition metal or post-transition metal atoms. Preferably, the transition metal or post-transition metal atoms are zero-valent. In an embodiment, the one or more metal atoms comprise Cu and/or Sn. In an embodiment, all $MoS_2$ layers of the photodetector are intercalated with one or more metal atoms. In an embodiment, the intercalated metal atoms comprise clusters of at least 2 atoms, islands of about 20 nm to about 50 nm, and/or a monolayer. In an embodiment, the photodetector comprises a phototransistor, a photodiode, and/or a photoconductor, preferably a photodiode.

The present disclosure also relates to a method of photodetection comprising a photodetector comprising 2D vertically-aligned $MoS_2$ layers, wherein a van der Waals (vdW) gap of at least two layers of the $MoS_2$ is intercalated with one or more transition metal or post-transition metal atoms. In an embodiment, the intercalated atom introduces electronic states near the conduction band of the $MoS_2$ and shift the Fermi level close to the conduction band edge. In an embodiment, the intercalated atom comprises Cu, and the photoresponse comprises a plasmonic resonance at an energy of about 1 eV to about 1.3 eV, preferably at about 2 eV, a near infrared (NIR) absorption of about 20% to about 60%, and/or a photoresponsivity of about an order of magnitude higher than a $MoS_2$ photodiode without intercalation over a spectral range of about 0.5 µm to about 1.1 µm. In another embodiment, the intercalated atom comprises Sn and the photoresponse comprises one or more plasmonic resonance at an energy of about 1.5 eV to about 1.8 eV, a near infrared (NIR) absorption of up to about 70%, and/or an enhanced photoresponsivity higher than a $MoS_2$ photodiode without intercalation over a spectral range of about 0.5 µm to about 1.1 µm. Preferably, the photoresponse comprises a broad spectral response that extends into the NIR spectrum. In an embodiment, the method is performed in low-light conditions, at night, and/or in high vegetation terrain. Preferably, the photodetector is a part of a night-vision image intensifier.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The patent or application file contains at least one figure executed in color. Copies of this patent or patent application publication with color figure(s) will be provided by the Office upon request and payment of the necessary fee.

Unit cells are indicated by solid lines. One of the layers is removed in the top view to show the intercalated Cu layer clearly.

Figure 11:
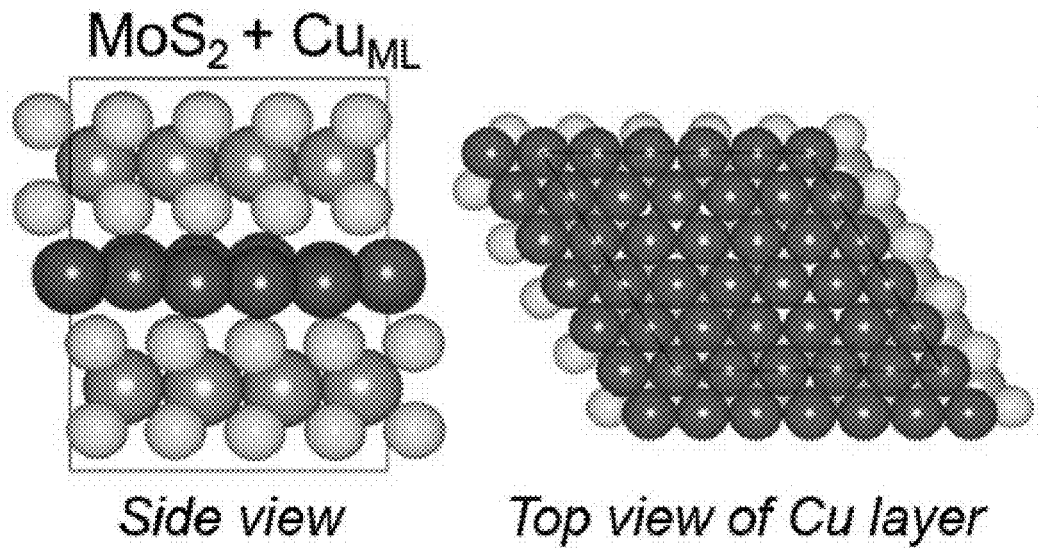

FIG. 11 depicts a structural model of a Cu (111) monolayer ($Cu_{ML}$) intercalated within a single vdW gap of bulk $MoS_2$. Unit cells are indicated by solid lines. One of the layers is removed in the top view to show the intercalated Cu layer clearly.

Figure 12:
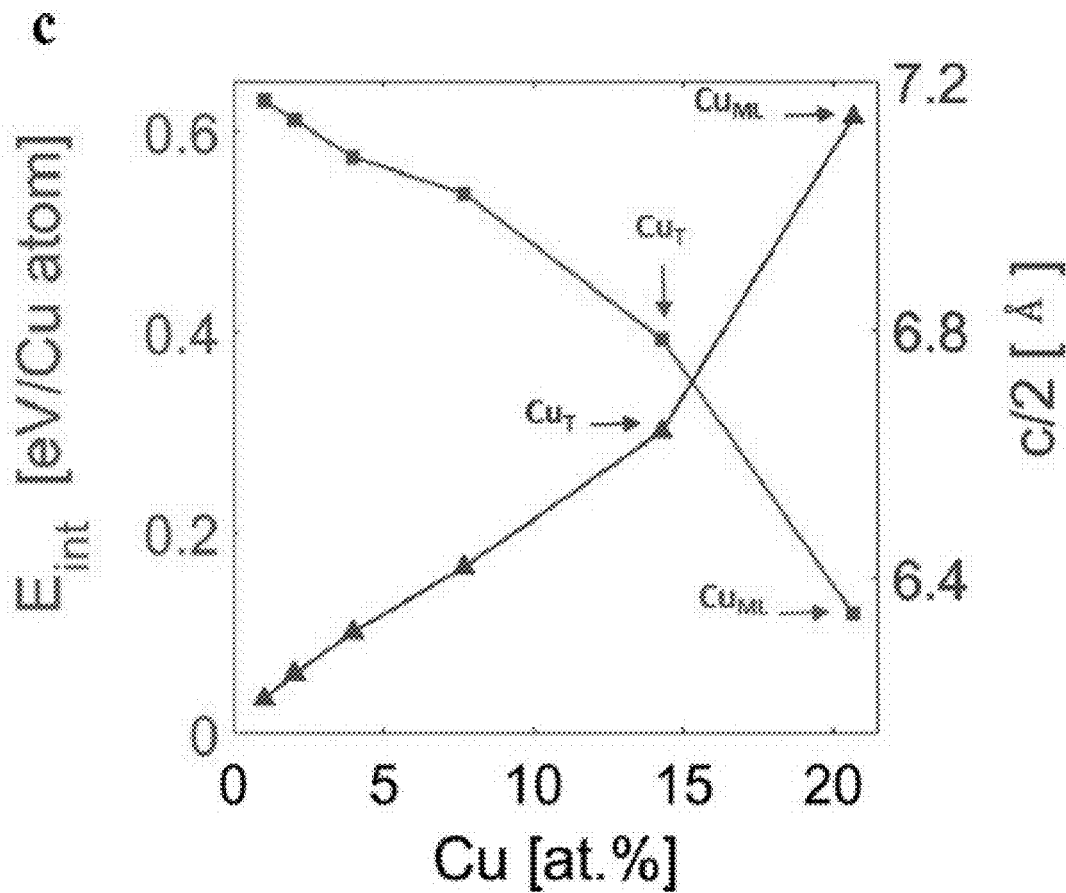

FIG. 12 is a graph showing the energy per Cu atom ($E_{int}$) required for intercalation in to the vdW gap, (depicted by the red line) and the resulting interlayer separation (depicted by the blue line) both as a function of Cu concentration.

Figure 13:
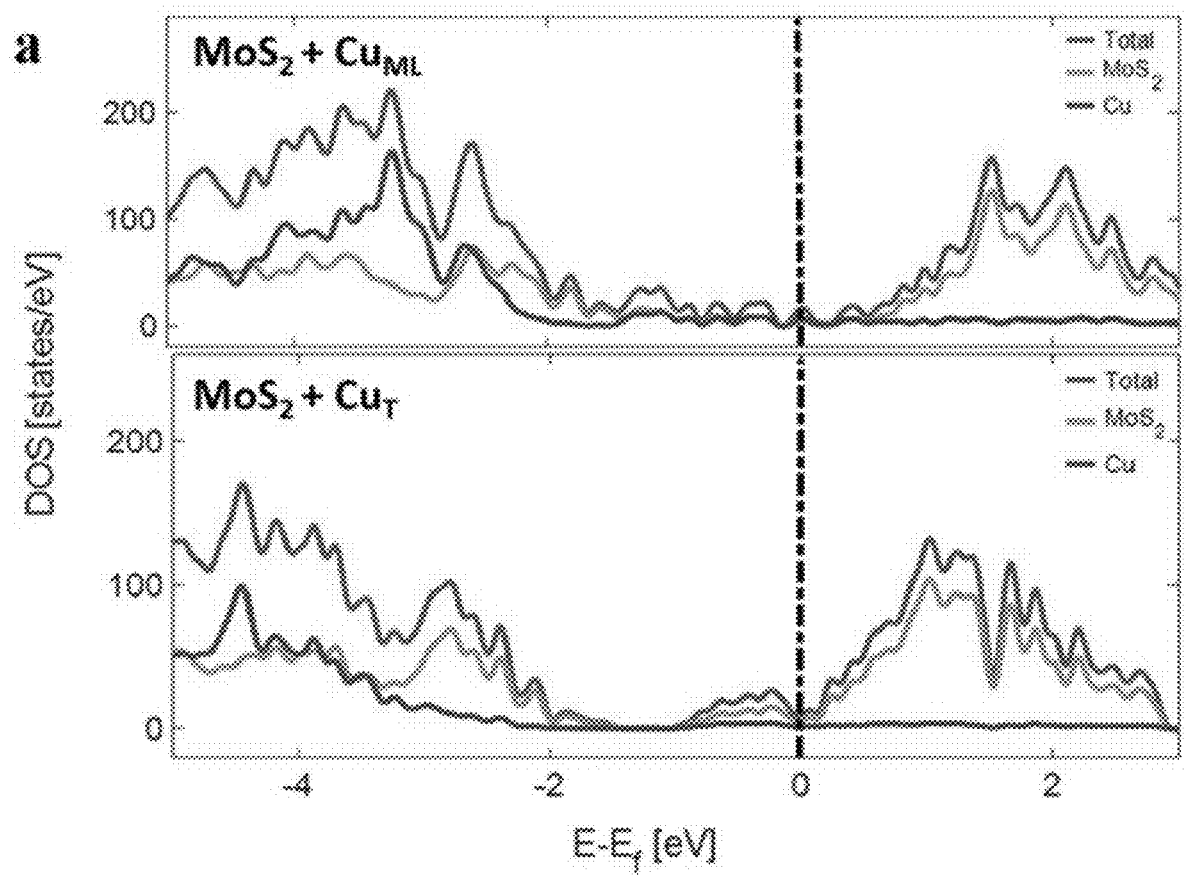

FIG. 13 shows density of states (DOS) of $MoS_2+Cu_{ML}$ and $MoS_2+CU_T$ models calculated with the HSE functional. The total DOS (depicted by red lines) is further decomposed into contributions from $MoS_2$ (depicted by green lines, and Cu (depicted by blue lines).

Figure 14:
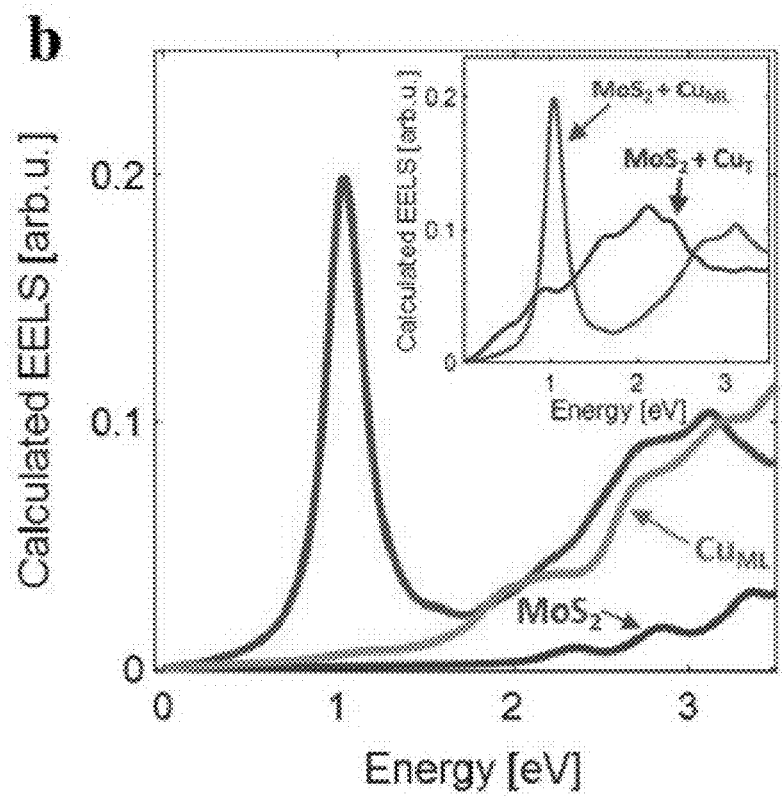

FIG. 14 shows the calculated EELS spectrum of the $MoS_2+CU_T$ model (depicted by the red line) bulk $MoS_2$ (depicted by the gray line) and the isolated $Cu_{ML}$. The inset compares the calculated EELS of the $MoS_2+Cu_{ML}$ and the $MoS_2+CU_T$ models.

Figure 15:
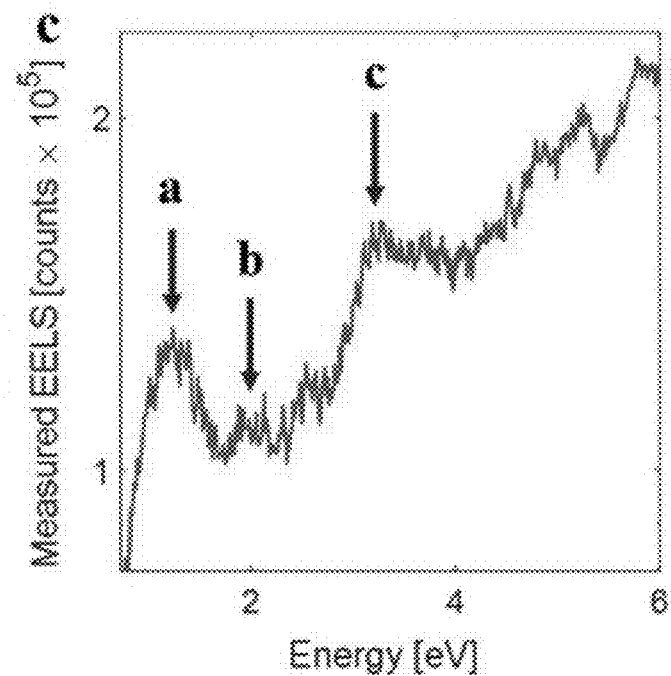

FIG. 15 is a graph of measured low-loss EELS spectra obtained from the Cu intercalated sample after removing the zero line peak.

Figure 16:
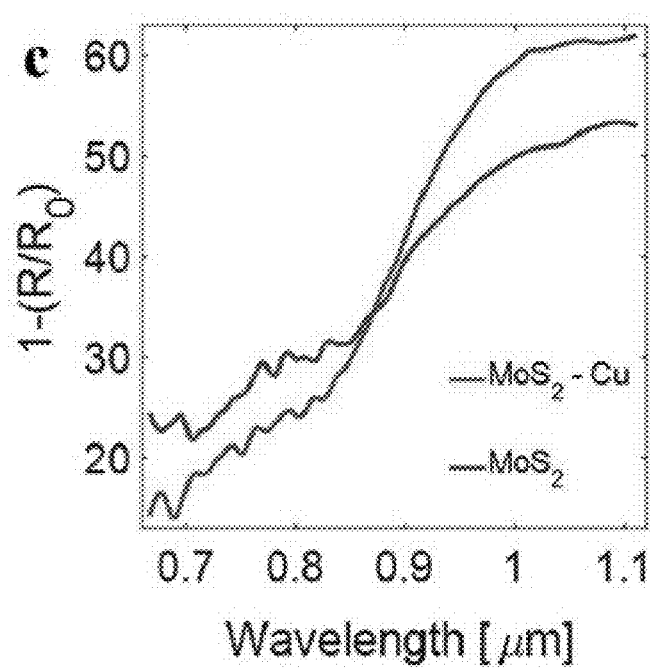

FIG. 16 is a graph of absorption versus wavelength of a $MoS_2$ device (depicted by the blue line) and a Cu intercalated $MoS_2$ device (depicted by the green line).

Figure 17:
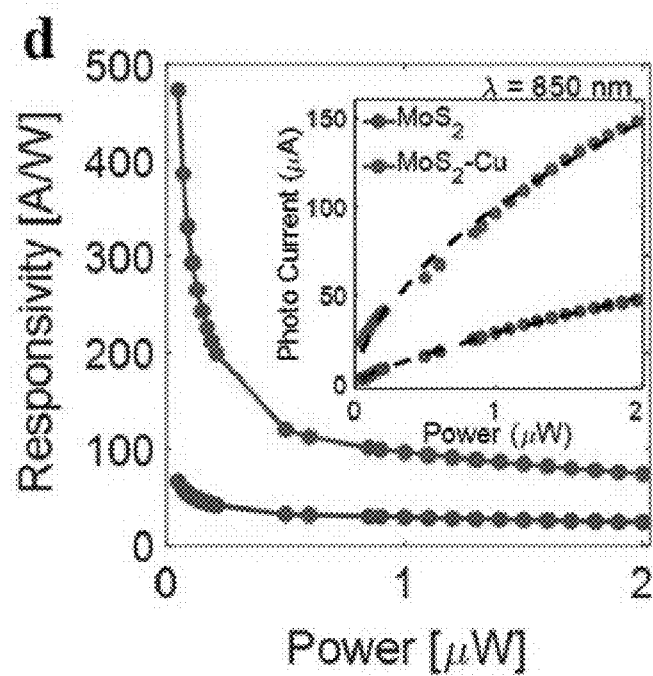

FIG. 17 is a graph of responsivity as a function of incident power intensity of the $MoS_2$ device (depicted by the blue line) and the Cu intercalated $MoS_2$ device (depicted by the green line) under illumination of 850 nm at a reverse bias of −2 V. The inset shows the dependence of photocurrent on incident power at a wavelength of 850 nm.

Figure 18:
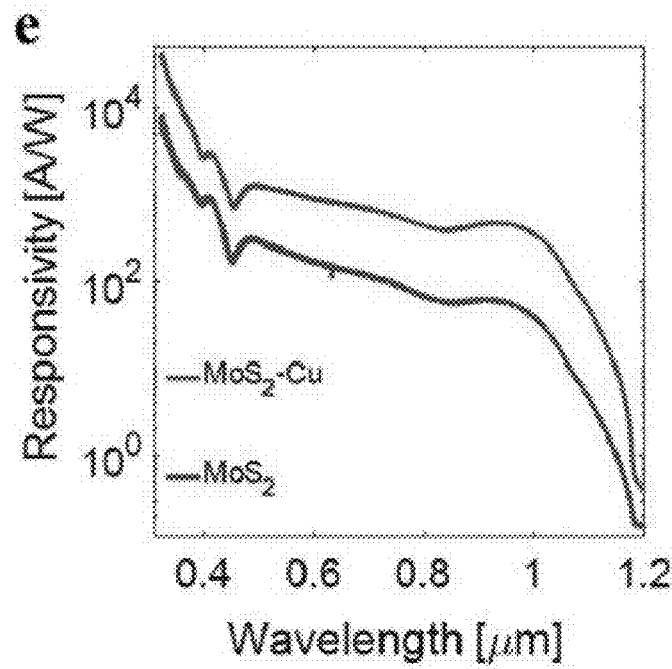

FIG. 18 is a graph of responsivity versus wavelength for the $MoS_2$ device (depicted by the blue line) and the Cu intercalated $MoS_2$ device (depicted by the green line).

Figure 19:
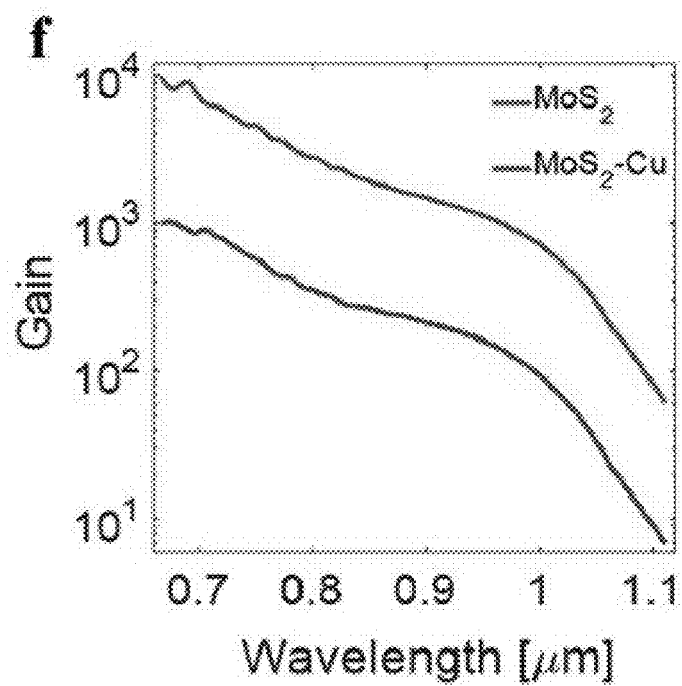

FIG. 19 is a graph of the gain versus wavelength for the $MoS_2$ device (depicted by the blue line) and the Cu intercalated $MoS_2$ device (depicted by the green line).

Figure 20:
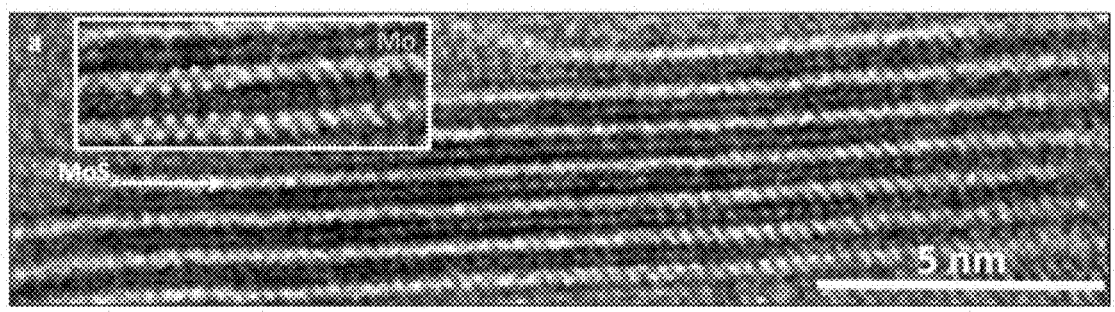

FIG. 20 is a STEM-HAADF image of Sn intercalated $MoS_2$ displaying an additional layer due to intercalation of Sn within the vdW gaps. Sn atoms are depicted in red, Mo in green, and S in yellow.

Figure 21:
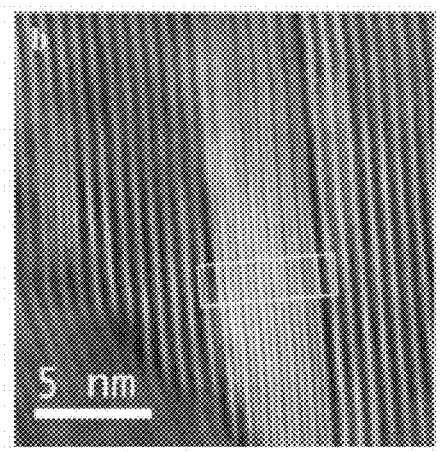

FIG. 21 is a STEM-HAADF image showing the periodic intensity contrast with $MoS_2$ and Sn appearing with bright contrast of parallel sets of planes.

Figure 22:
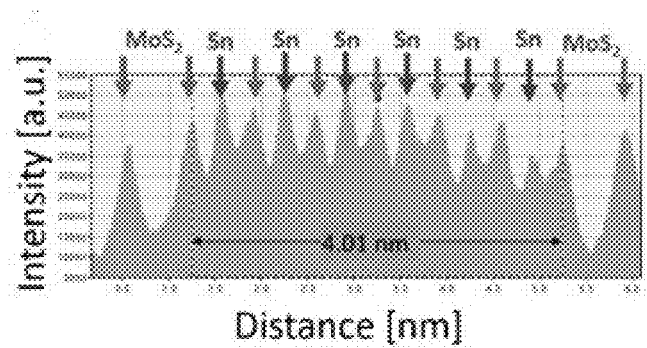

FIG. 22 is a graphic depiction of the intensity profile across the rectangle marked in FIG. 21. The blue arrows indicate the $MoS_2$ layers, and the red arrows indicate the intercalated Sn layer.

Figure 23:
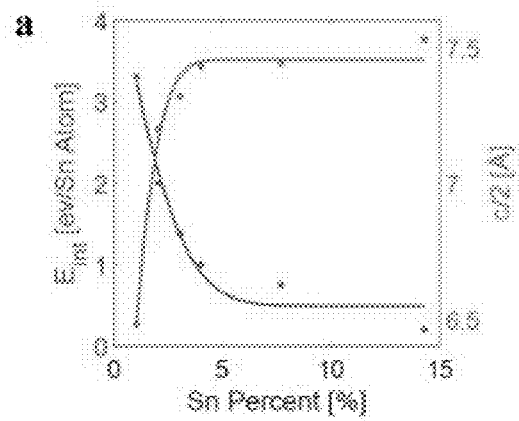

FIG. 23 is a graph showing energy per Sn atom ($E_{int}$) required for intercalation into the vdW gap, and the resulting interlayer separation (depicted by the red line), as functions of Sn concentration.

Figure 24:
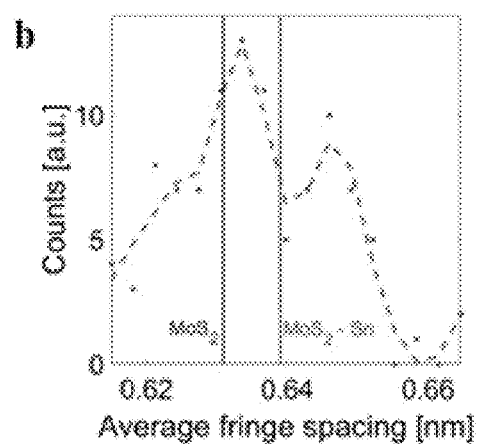

FIG. 24 is a graph of the distribution and mean value of interlayer spacing between VA-$MoS_2$ planes before (depicted by the blue line), and after (depicted by the red line) Sn intercalation.

Figure 25:
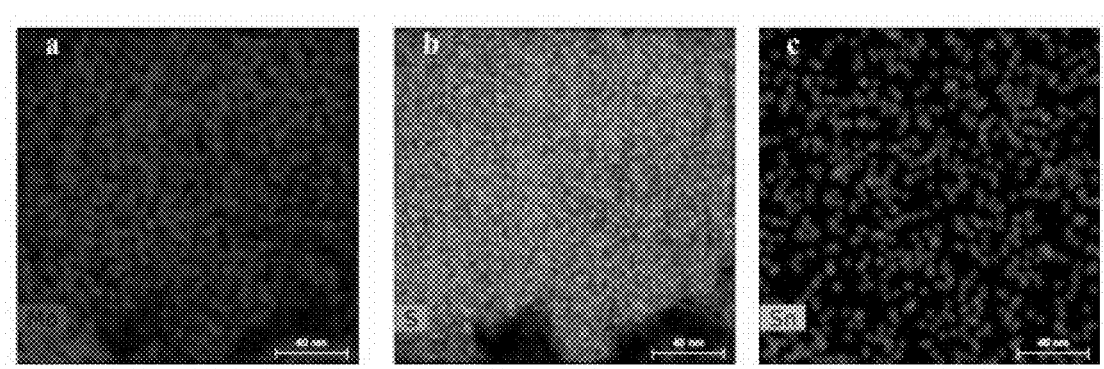

FIG. 25 is an elemental distribution map of a) Mo, b) S, and c) Cn as collected by Energy Dispersive Spectroscopy (EDS).

Figure 26:
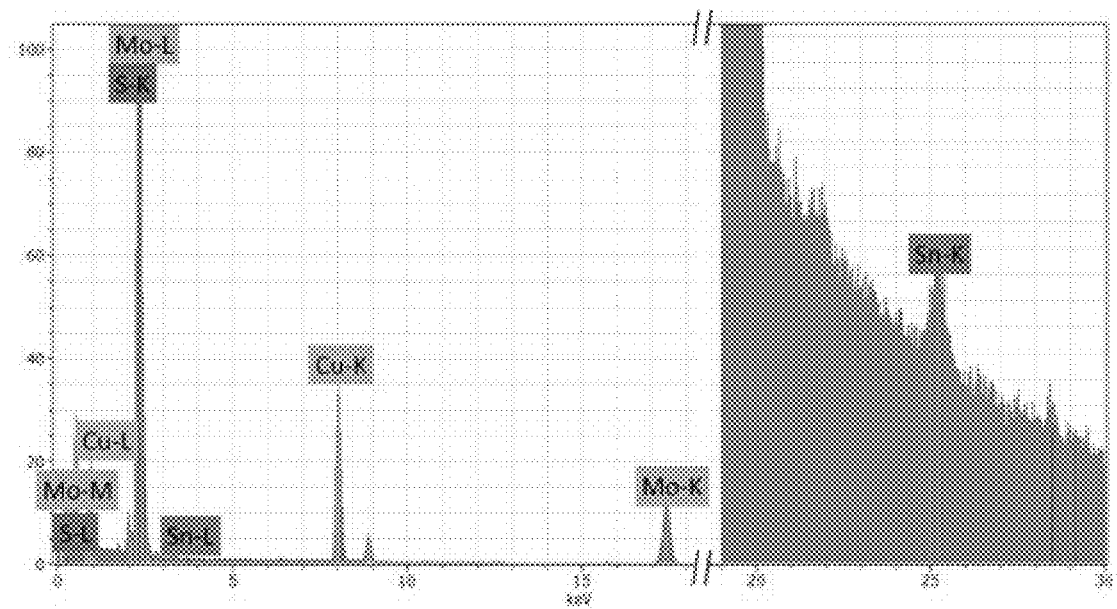

FIG. 26 is an EDS spectrum from energy dispersive spectra mapping of S, Mo, and Sn. The y-axis is amplified 100× after 19 keV. The Cu signal is noted form the Cu grid used to mount the sample.

Figure 27:
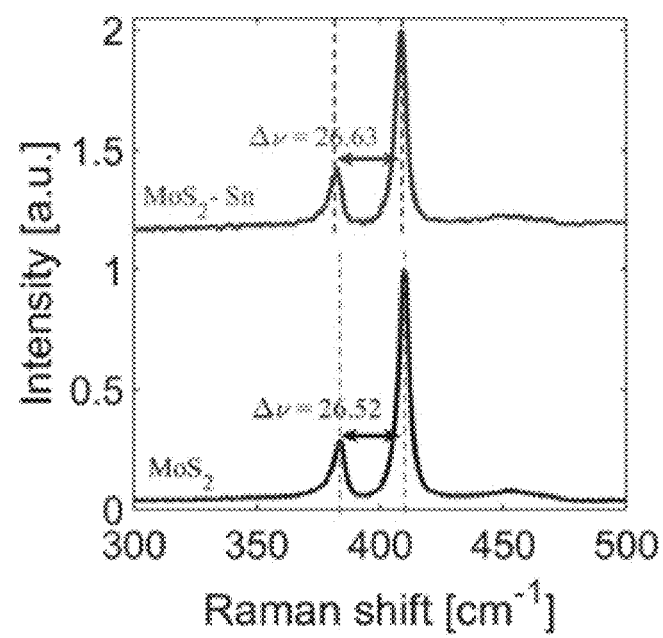

FIG. 27 displays Raman spectra of 2H-$MoS_2$ structure before and after Sn intercalation. Before intercalation is represented by the blue spectrum and after intercalation is represented by the red spectrum.

Figure 28:
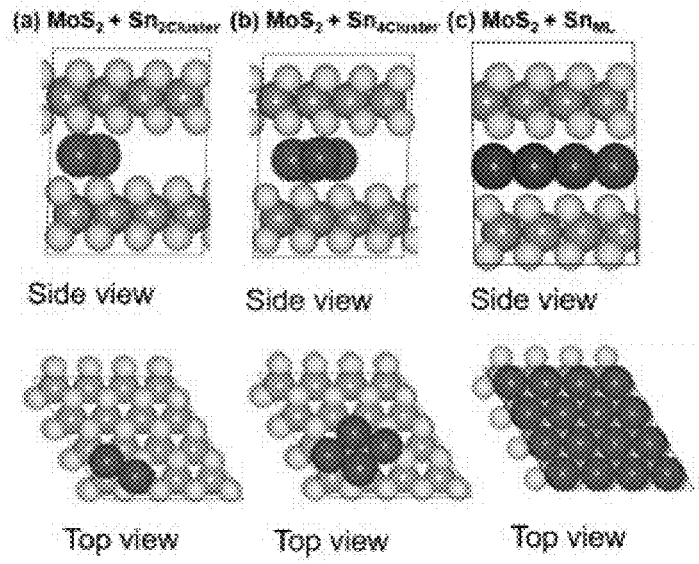

FIG. 28 depicts a structural model of (a) a two-Sn atom cluster ($Sn_{2cluster}$), (b) a four-Sn atom cluster ($Sn_{4cluster}$) and (c) a Sn monolayer ($Sn_{ML}$) intercalated within a single vdW gap of bulk $MoS_2$. One of the layers is removed in the top view to show the intercalated Sn layer clearly.

Figure 29:
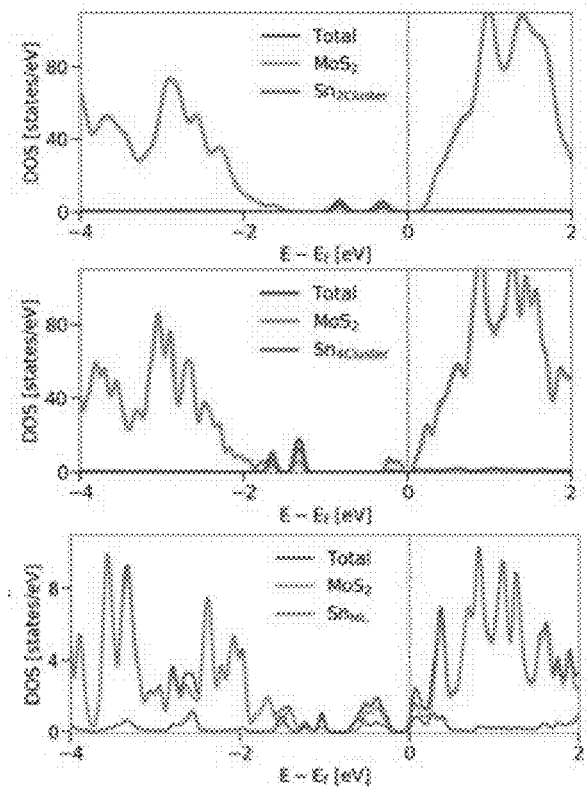

FIG. 29 shows density of states (DOS) of $MoS_2+Sn_{2cluster}$ and $MoS_2+Sn_{4cluster}$ and $MoS_2+Sn_{ML}$ models calculated with the HSE functional. The total DOS (depicted by blue lines) is further decomposed into contributions from $MoS_2$ (depicted by orange line) and Sn (depicted by green lines).

Figure 30:
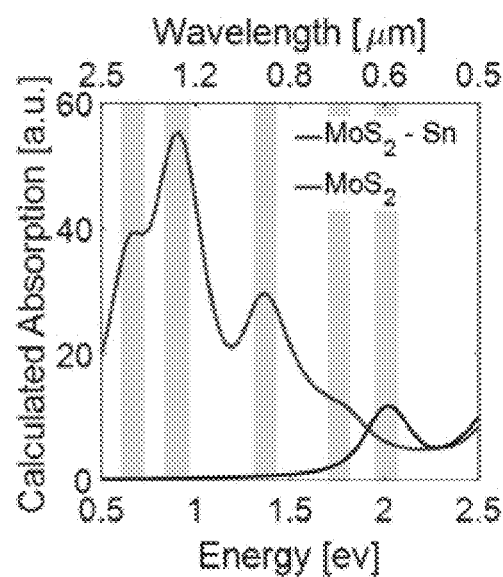

FIG. 30 is a graph of the calculated absorption spectrum of the $MoS_2+Sn_{ML}$ device (depicted by a red line) and the $MoS_2$ device (depicted by the blue line). Absorption peaks are highlighted with bars of the same color.

Figure 31:
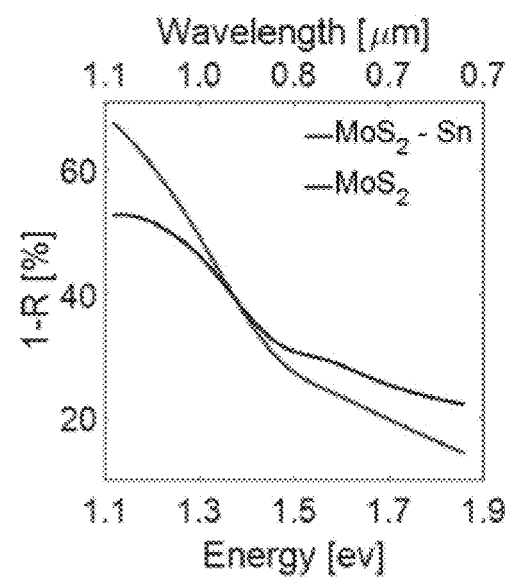

FIG. 31 is a graph of measured absorption vs wavelength of the $MoS_2$ device (depicted by the blue line) and the Sn intercalated $MoS_2$ device (depicted by the red line).

Figure 32:
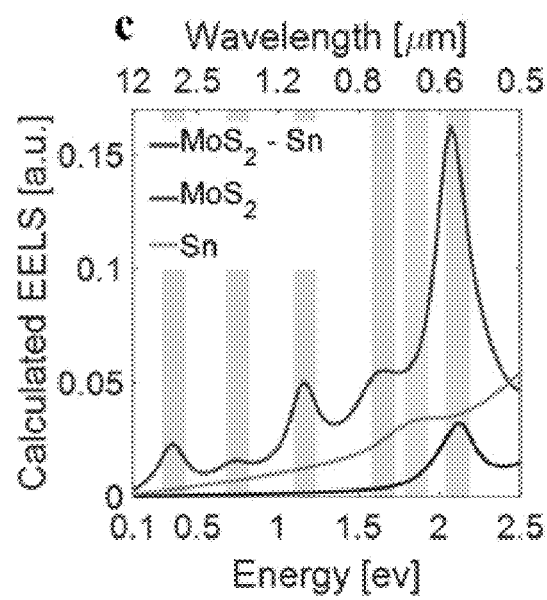

FIG. 32 is a graph of the calculated EELS spectrum of the $MoS_2+Sn_{ML}$ model (depicted by the red line), $MoS_2$ (depicted by the blue line) and the isolated $Sn_{ML}$ (depicted by the green line). EELS peaks are highlighted with bars of the same color.

Figure 33:
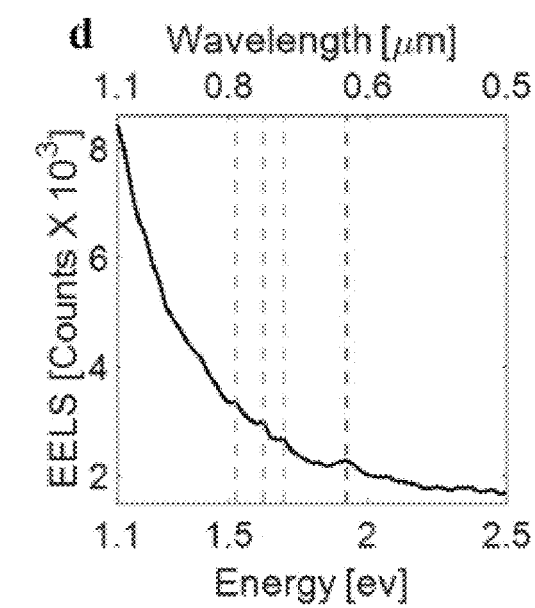

FIG. 33 is a graph of low-loss EELS spectra obtained from the Sn intercalated sample after removing the zero line peak.

Figure 34:
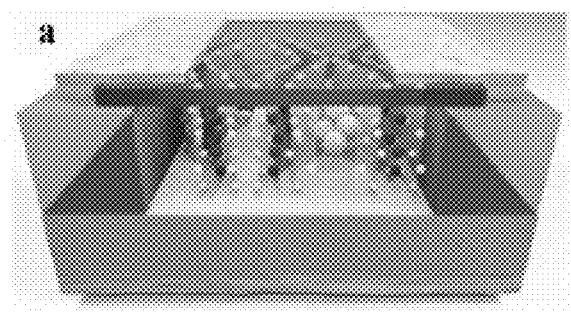

FIG. 34 is a graphical illustration of a cross-section of a VA-$MoS_2$ heterostructure photodiode device intercalated by Sn. $MoS_2$ is represented by yellow and black atoms, Sn is represented by grey atoms, and the Si substrate is light blue.

Figure 35:
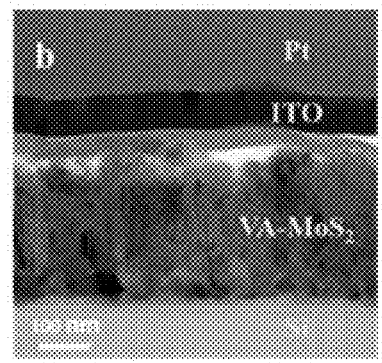

FIG. 35 is a bright field TEM micrograph of the cross-section of the Sn intercalated VA-$MoS_2$ photodiode device structure.

Figure 36:
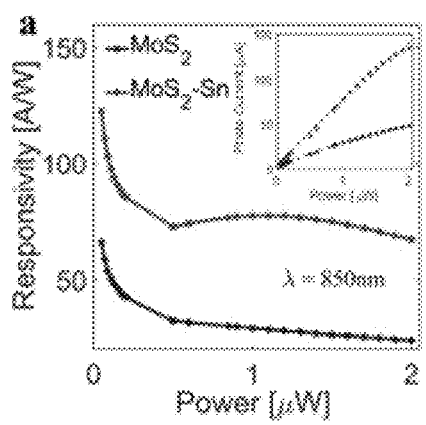

FIG. 36 is a graph of responsivity as a function of incident power intensity of the $MoS_2$ device (depicted by the blue line) and the Sn intercalated $MoS_2$ device (depicted by the red line) under illumination of 850 nm at a reverse bias of −2V. The inset depicts the dependence of photocurrent on incident power at a wavelength of 850 nm.

Figure 37:
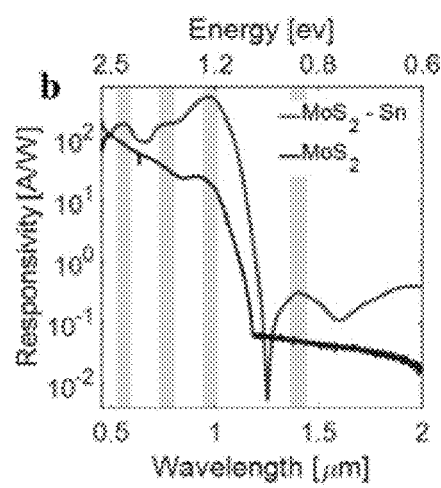

FIG. 37 is a graph of responsivity versus wavelength of the $MoS_2$ device (depicted by the blue line) and the Sn intercalated $MoS_2$ device (depicted by the red line). Responsivity peaks are highlighted with bars of the same color.

Figure 38:
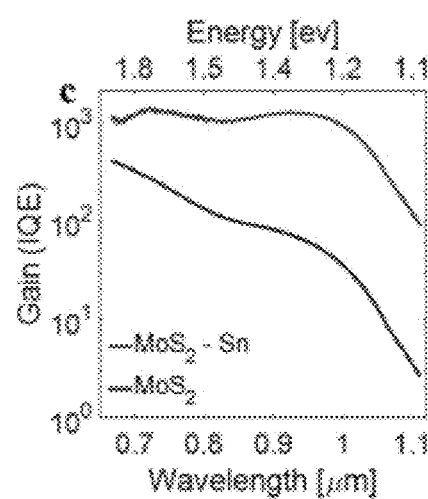

FIG. 38 is a graph of gain as a function of wavelength of the $MoS_2$ device (depicted by the blue line) and the Sn intercalated $MoS_2$ device (as depicted by the red line).

Various embodiments are described with reference to the figures. Reference to these embodiments does not limit the scope of the disclosure. Figures represented herein are not limitations to the various embodiments according to the invention and are presented for non-limiting illustration of the invention.

DETAILED DESCRIPTION

The present disclosure relates to vertically-aligned molybdenum sulfide (VA-$MoS_2$) devices intercalated with a transition metal and/or a post-transition metal, specifically Cu and/or Sn. Optical sensors, such as photodiodes, comprising Cu and/or Sn intercalated VA-$MoS_2$ devices comprise more conductive atoms within the $MoS_2$ structure to enhance electrical and optical properties of the device. Transition metal and/or a post-transition metal intercalated $MoS_2$ photodiodes demonstrate increased photoresponsivity over non-intercalated devices. In an embodiment, the photoresponse enhancement of intercalated devices is attributed to efficient ionization of zero-valent intercalated atoms by photocarriers.

The embodiments described herein are not limited to any particular device or method of using the device, which can vary and are understood by skilled artisans based on the present disclosure herein. It is further to be understood that all terminology used herein is for the purpose of describing particular embodiments only, and is not intended to be limiting in any manner or scope. For example, as used in this specification and the appended claims, the singular forms "a," "an," and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numerical values within that range, for example, 1, 2, 3, 4, 5, and 6, and decimals and fractions, for example, 1.2, 3.8, 1½, and 4¾ this applies regardless of the breadth of the range.

References to elements herein are intended to encompass any or all of their oxidative states, including zero, and isotopes unless stated otherwise. For example discussion of molybdenum, copper and tin can include $Mo^{II}$, $Mo^{III}$, $Mo^{IV}$, $Mo^{V}$, $Mo^{VI}$, $Cu^{I}$, $Cu^{II}$, $Sn^{II}$, and $Sn^{IV}$; references to sulfur include any of its stable isotopes, i.e., $^{32}S$, $^{33}S$, $^{34}S$, and $^{36}S$; while specifically describing the stable isotopes, other isotopes fall within the scope of the disclosure.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation. The preferred materials and methods are described herein. In describing and claiming the embodiments of the present invention, the following terminology will be used in accordance with the definitions set out below.

The term "about," as used herein, refers to variations in size, distance or any other types of measurements that can be resulted from inherent heterogeneous nature of the measured objects and imprecise nature of the measurements itself, including, but not limited to, mass, volume, time, distance, wavelength, frequency, voltage, current, absorption, gain, EELS, photoresponsivity, and electromagnetic field. The term "about" also encompasses variation in the numerical quantity that can occur, for example, through typical measuring or handling procedures in the real world; through inadvertent error in these procedures; through differences in the manufacture, source, or purity of the ingredients used to make the device or carry out the methods, and the like. Whether or not modified by the term "about", the claims include equivalents to the quantities.

As referred to herein, "2D" refers to materials having a nanoscale-thickness wherein the thickness of the material is much less than its lateral dimensions. The nanometer scale comprises a range from about 1 nm to about 100 nm. In an embodiment, a 2D layer comprises a monolayer. In an embodiment, a 2D layer comprises a single layer of crystalline atoms.

Intercalation of 2D materials refers to the process of inserting one or more foreign species in between a layered 2D material's van der Waals (vdW) gap, which is possible when more than one 2D layer is present.

As referred to herein, $2H\text{-}MoS_2$ refers to the hexagonal crystal structure of $MoS_2$.

As referred to herein, transition metal refers to groups 3 to 11 of the Periodic Table of Elements and includes scandium (Sc), titanium (Ti), iron (Fe), chromium (Cr), manganese (Mn), vanadium (V), copper (Cu), cobalt (Co), nickel (Ni), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), gold (Au), platinum (Pt), mercury (Hg), actinium (Ac), rutherfordium (Rf), dubnium (db), seaborgium (Sg), bohrium (Bf), Hassium (Hs), Meitnerium (Mt), darmstadtium (Ds), roentgenium (Rg), and copericium (Cn). As referred to herein, a post-transition metal is a metallic element in the Periodic Table of Elements located between the transition metals and weaker nonmetallic metalloids and includes aluminum (Al), gallium (Ga), indium (In), tin (Sn), thallium (Tl), lead (Pb), and bismuth (Bi).

$MoS_2$ Layers with Metal Intercalation

The present disclosure relates to vertically-aligned molybdenum sulfide ($VA\text{-}MoS_2$) devices intercalated with a transition metal and/or a post-transition metal. Beneficially, the intercalated $MoS_2$ layers disclosed herein can be used for enhanced photodetection and provide improvements in photodetection. For example, devices including the intercalated $MoS_2$ layers disclosed herein can be used in low light conditions for enhanced photodetection.

$MoS_2$ layers as described herein can be obtained or formed. In an embodiment, $MoS_2$ layers are formed by chemical vapor deposition (CVD). In an embodiment, $MoS_2$ layers are formed by physical vapor deposition (PVD). In an embodiment, $MoS_2$ layers are formed by exfoliation. In a preferred embodiment, $VA\text{-}MoS_2$ layers are formed by CVD.

In an embodiment, $MoS_2$ is intercalated with a transition metal. In an embodiment, the $MoS_2$ is intercalated with a post-transition metal. In an embodiment, the $MoS_2$ is intercalated with a group 11 metal. In an embodiment, the $MoS_2$ is intercalated with a group 14 post-transition metal. Preferably, the $MoS_2$ is intercalated with Cu and/or with Sn. To demonstrate this, non-limiting examples are provided showing intercalation with copper (illustrative of a transition metal) and tin (illustrative of a post-transition metal). Preferably, $MoS_2$ layers are intercalated with metal atoms by a wet-chemical process. In a wet-chemical process, $MoS_2$ layers are placed in a solution comprising the metal atom and a solvent to allow the atoms to intercalate between the $MoS_2$ layers. The intercalated layers may then be rinsed and dried. A wet-chemical intercalation process may employ heating, stirring, sonication, catalysts, and the like.

Figure 1:
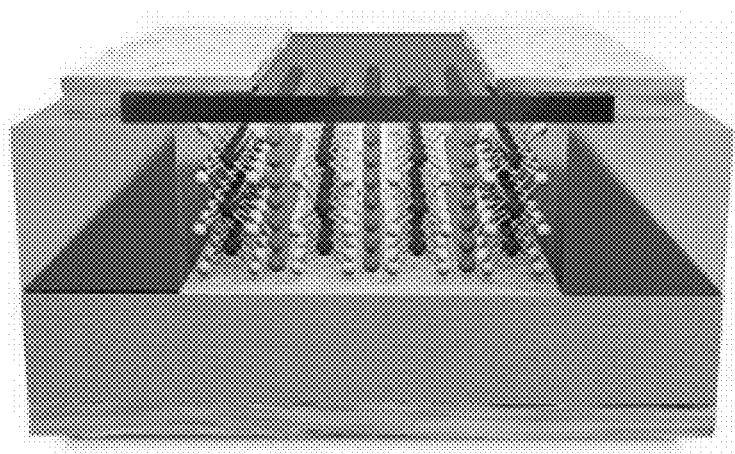
FIG. 1 is a graphical illustration of a cross-section of a VA-$MoS_2$—Si heterostructure photodiode device intercalated by Cu. Cu is represented by red atoms, $MoS_2$ is represented by yellow and black atoms, and the Si substrate is light blue.

An illustrated example of a Cu intercalated $VA\text{-}MoS_2$ photodiode on a silicon (Si) substrate is shown in FIG. 1, and an illustrated example of a Sn intercalated VA-$MoS_2$ photodiode is shown in FIG. 34, wherein in each $MoS_2$ is represented by yellow and black atoms. In FIG. 1, the Cu is depicted by red atoms in the form of a monolayer, and in FIG. 35, the Sn is depicted by grey atoms in clusters. In an embodiment, one or more portions of a $MoS_2$ photodetector comprise the same or different intercalated atoms.

In an embodiment, the intercalated metal atoms are zerovalent, wherein the oxidation state is zero.

The present disclosure relates to a photodetector comprising intercalated $MoS_2$ layers according to any embodiment disclosed herein. In an embodiment, the photodetector comprises at least two intercalated 2D $MoS_2$ layers. Preferably, the photodetector comprises two intercalated 2D $MoS_2$ layers, three intercalated 2D $MoS_2$ layers, four intercalated 2D $MoS_2$ layers, five intercalated 2D $MoS_2$ layers, six intercalated 2D $MoS_2$ layers, seven intercalated 2D $MoS_2$ layers, eight intercalated 2D $MoS_2$ layers, nine intercalated 2D $MoS_2$ layers, ten intercalated 2D $MoS_2$ layers, or more. In a preferred embodiment, the photodetector comprises twenty 2D $MoS_2$ layers, fifty intercalated 2D $MoS_2$ layers, hundreds of intercalated 2D $MoS_2$ layers, thousands of intercalated 2D $MoS_2$ layers, or more. In an embodiment, the 2D $MoS_2$ layers comprise 2H-$MoS_2$.

As referred to herein, a photodetector, or optical sensor, refers to a device that detects or responds to light by electrical effect of photons. In an embodiment, a photodetector comprises a phototransistor, a photodiode, and/or a photoconductor. In an embodiment, a photodetector is a photodiode. As referred to herein, a photodiode refers to a semiconducting device with a PN junction which, when exposed to light, generates a potential difference, or changes its electrical resistance. As referred to herein, a photoresponse refers to a measurable response to light. The photoresponse may comprise EELS, gain, absorption, responsivity, and the like.

In an embodiment, the $MoS_2$ layers are intercalated with one or more metal atoms, of the same type. In an embodiment, the $MoS_2$ layers are intercalated with multiple clusters comprising at least two metal atoms. In an embodiment the $MoS_2$ layers are intercalated with clusters of metal atoms that form islands. In an embodiment, the islands are from about 10 nm to about 100 nm in size. In an embodiment, islands are from about 20 nm to about 50 nm in size. In an embodiment, the $MoS_2$ layers are intercalated with one or more monolayers of metal atoms. In an embodiment, the $MoS_2$ layers are intercalated with a combination of monolayers, clusters, individual atoms, and/or islands of metal atoms. In an embodiment, the photodetectors comprise more than one intercalated $MoS_2$ layer, any one of which comprises intercalated clusters, atoms, islands, and/or monolayers of metal atoms. In an embodiment, an $MoS_2$ layer comprises a planar monolayer of intercalated metal atoms. In another embodiment, a $MoS_2$ device comprises regions of complete, partial, and no intercalation. In an embodiment a photodetector comprises $MoS_2$ layers intercalated with atoms of one metal, and $MoS_2$ layers intercalated with atoms of a different, distinct metal. In an embodiment, a photodetector comprises $MoS_2$ layers intercalated with Cu and $MoS_2$ layers intercalated with Sn.

The present disclosure relates to a method of photodetection comprising a photodetector comprising intercalated $MoS_2$ layers according to any embodiment described herein. In an embodiment, the intercalated atoms introduce electronic states near the conduction band of $MoS_2$ and shift the Fermi level close to the conduction band edge. In an embodiment, the photoresponse comprises a plasmonic resonance unique to the intercalated metal atom. In an embodiment, the photoresponse of a Cu intercalated $MoS_2$ device comprises a plasmonic resonance at an energy of approximately 1 eV to approximately 1.3 eV. In an embodiment, the photoresponse of a Cu intercalated $MoS_2$ device comprises a plasmonic resonance at an energy of approximately 2 eV. In an embodiment, the photoresponse of a Sn intercalated $MoS_2$ device comprises one or more plasmonic resonance at an energy of approximately 1.5 eV to approximately 1.8 eV.

In an embodiment, intercalation enhances or improves the photoresponsivity of a $MoS_2$ device. Preferably, intercalation enhances NIR absorption of a $MoS_2$ device. As referred to herein, NIR refers to wavelengths of from about 0.7 μm to about 2.5 μm.

In an embodiment, a Cu intercalated $MoS_2$ device comprises an NIR absorption of about 10% to about 70%, or more. In a preferred embodiment a Cu intercalated $MoS_2$ device has an NIR absorption of about 20% to about 65%, in another preferred embodiment a Cu intercalated $MoS_2$ device has an NIR absorption of about 40% to about 60%. In an embodiment, the photoresponsivity of a $MoS_2$ device intercalated with Cu comprises a maximum value of from about $1 \times 10^4$ A/W to about $5 \times 10^4$ A/W. In an embodiment, the photoresponsivity of a $MoS_2$ device intercalated with Cu comprises a maximum value approximately $4.2 \times 10^4$ A/W. In an embodiment, the photoresponsivity of a $MoS_2$ device intercalated with Cu comprises an average value of from about 800 A/W to about 900 A/W, or from about 825 A/W to about 835 A/W. In an embodiment, the photoresponsivity of a $MoS_2$ device intercalated with Cu comprises a plateau in the spectral range of about 500 to about 850 nm.

In an embodiment, a Sn intercalated $MoS_2$ device has an NIR absorption of about 10% to about 70% or more. In a preferred embodiment a Sn intercalated $MoS_2$ device has an NIR absorption of about 20% to about 70%, in another preferred embodiment a Sn intercalated $MoS_2$ device has an NIR absorption of about 40% to about 70%. In an embodiment, the photoresponsivity of a Sn intercalated $MoS_2$ device has an increased absorption over a non-intercalated $MoS_2$ device over a spectral range of about 0.5 μm to about 1.1 μm.

In an embodiment, the method of photodetection for any embodiments described herein is performed in low-light conditions, for example in conditions having 100 or fewer lumens, 50 or fewer lumens, or 10 or fewer lumens. In an embodiment, the method of photodetection for any embodiments described herein is performed at night. In an embodiment, the method of photodetection for any embodiments described herein is performed in high-vegetation terrain, such as forests or agricultural fields or any dense vegetation. In an embodiment, night-vision image intensifiers comprise the photodetectors as described herein.

EXAMPLES

Embodiments of the present disclosure are further defined in the following non-limiting Examples. It should be understood that these Examples, while indicating one or more preferred embodiments, are given by way of illustration only. From the above discussion and these Examples, one skilled in the art can ascertain the essential characteristics of the inventions, and without departing from the spirit and scope thereof, can make various changes and modifications of the embodiments of the inventions to adapt to various usages and conditions. Thus, various modifications of the embodiments, in addition to those shown and described herein, will be apparent to those skilled in the art from the foregoing description. Such modifications are also intended to fall within the scope of the appended claims.

Device Preparation

CVD-grown, vertically-aligned, $MoS_2$—Si diodes (VA-$MoS_2$) were prepared according to standard practice. Zero-valent Cu or Sn atoms were intercalated into the vdW gaps between the layers of $MoS_2$ by a wet-chemical process. 0.01 g of tetrakisacetonitrile copper or tin hexafluorophosphate (Millipore-Sigma) was added to 5 mL acetone in a round-bottom flask attached to a Liebig reflux condenser. The solution was brought almost to reflux at 48° C. The substrate was placed into the solution in the round-bottom flask. The solution was allowed to sit just below reflux for 4 hours, whereupon it was removed and rinsed with acetone several times. Top indium tin oxide (ITO) and metal contacts were deposited after patterning with e-beam lithography.

Raman Spectroscopy

Raman spectra were obtained using a Horiba Scientific Labram HR Evolution equipped using 532 nm solid state excitation laser and an optical microscope. The laser excitation propagated parallel to the crystal c-axis with linear polarization. A 50× objective lens was used to focus the laser and collect the Raman scattered light, and an 1800 lines per mm grating was chosen for spectrum acquisition.

FIB, TEM, STEM-EDS, EELS

Site-specific, cross-sectional focused ion beam (FIB) prepared transmission electron microscopy (TEM) lamellae were imaged using a Probe corrected FEI Titan G2 ChemiSTEM TEM equipped with a Super-X energy dispersive x-ray spectroscopy (EDX) system, which comprised four windowless silicon drift detectors of 120 $mm^2$ size, having an overall energy resolution better than 140 eV. The microscope was mounted with a Gatan 994 UltraScan 4K CCD Camera, and the system has a point resolution better than 0.24 nm in the TEM mode and 80 µm in the scanning transmission electron microscopy (STEM) mode at 200 kV accelerating voltage. The samples were imaged both in TEM and STEM modes as well as analyzed using STEM energy dispersive spectroscopy (STEM-EDS). To avoid stray Cu or Sn signals in the EDS spectra, appropriate care was taken and molybdenum grids, rings, and clips were used for loading the sample in the TEM holder.

The EDS data were acquired and analyzed using the Bruker QUANTAX Esprit 1.9 software. The elemental quantification was performed using the Cliff-Lorimer method with the same software.

Electron energy loss spectroscopy (EELS) was performed using a double-corrected FEI Titan Themis 60-300 kV equipped with a gun monochromator and a Gatan GIF Enfinium Fast dual EELS spectrometer, providing an energy spread of less than 0.19 eV at 60 kV. The spectra were acquired with an energy dispersion of 0.01 eV per channel, using 2.5 mm entrance aperture, and with 0.005 s exposure integrated over 2 s.

Photoconductivity Measurements

The monochromatic measurements were carried out at ambient conditions under illumination of a collimated 850 nm light-emitting diode (LED). Spectral responsivity and photocurrent were obtained by connecting the devices to an external detector socket of a Thermo Fisher Scientific Nicolet-iS50R. To obtain the quartz-halogen source black-body radiation curve, the source was measured using a deuterated triglycine sulfate (DTGS) detector. The device photocurrent spectrum was normalized to the source black-body curve to obtain the device's responsivity curve.

Computational Methods

Density functional theory (DFT) calculations were preformed using the Vienna Ab Initio Simulation Package (VASP version 5.4.1). Core and valence electrons were described using the projector-augmented wave method and the Perdew-Burke-Ernzerhof generalized-gradient approximation was used to describe electron exchange and correlation. The kinetic energy cutoff was set to 400 eV and Gaussian smearing of 0.05 eV was used for integrations over the Brillouin zone. The conjugate-gradient algorithm was used for structural optimizations of all DFT models with a tolerance of 0.01 eV per Å. During structural optimization, both atomic positions and cell vectors were relaxed. To model the intercalation of Cu or Sn atoms in bulk 2H-$MoS_2$, 4×4×1 $MoS_2$ supercells were employed; this supercell was nearly commensurate with a 5×5 Cu or Sn (111) monolayer. The DFT-D3 method was employed to include vdW interactions between $MoS_2$ layers. A sufficiently dense 4×4×3 Γ-centered k-point mesh was used to sample the Brillouin zones of the supercells. As semilocal functionals underestimate fundamental gaps, the hybrid Heyd-Scuseria-Ernzerfoh (HSE06) functional was employed to calculate electronic structure and optical properties. PBE-relaxed $Cu_xMoS_2$ or $Sn_xMoS_2$ structures were used in these calculations as the computational cost of structural relaxation with HSE is prohibitive.

Reflection Measurements

Reflection spectra were obtained using a Thermo Fisher Scientific Nicolet iS50R Fourier-transform infrared (FTIR) and a Nicolet ContinuµM FTIR microscope. Spectral range was set to 9,000-27,000 $cm^{-1}$ using a quartz-halogen (27000-2000 $cm^{-1}$) source, a quartz beam splitter, and a silicon detector. Aperture size was set to fit the device aperture. A 15× objective lens was used to focus light and collect spectra from both a silver mirror as the background and the devices as the sample.

Responsivity Measurements

The photocurrent spectra were obtained by electrically connecting the measured devices to the external detector socket of the instrument, replacing the instrument's detector. Spectral range was set to 9,000-27,000 $cm^1$ using a quartz-halogen (27000-2000 cm-1) source and a quartz beam splitter. To obtain the spectral irradiance at the measured device, the single-beam spectrum of the quartz-halogen lamp was measured independently using the FTIR DTGS detector, which has a fairly flat responsivity. Due to lack of the specific responsivity spectrum of the used DTGS detector imbedded in the FTIR instrument, only the qualitative shape of the quartz-halogen source was extracted by fitting the single-beam result to Planck's black-body law with a temperature of 1800 K. After normalizing the irradiance obtained from the Planck model by its peak, the ratios of the power emitted at each wavelength remain constant. Next, the measured photocurrent spectrum was normalized to the source's black body curve, achieving the qualitative shape of the spectral responsivity curve. Finally, the qualitative spectral responsivity curve was normalized to the value found at 850 nm and then matched to the responsivity value obtained with a 850 nm calibrated light emitting diode (LED), independently measured as described above in the photocurrent measurements section.

Example 1—Cu Intercalated $MoS_2$

Figure 2:
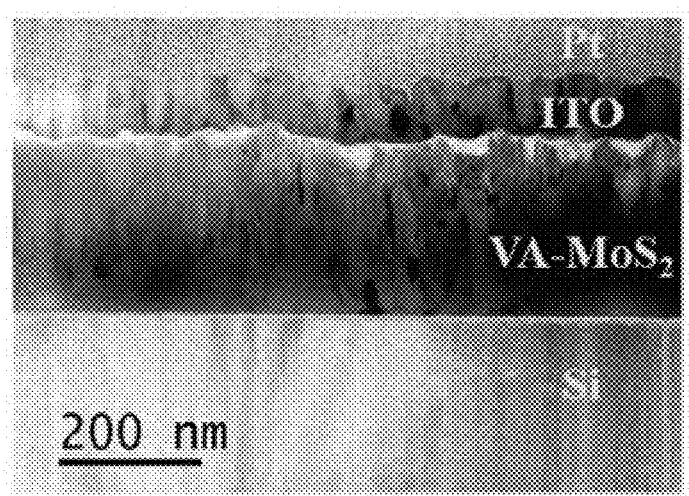
FIG. 2 is a cross-section transmission electron microscopy (TEM) image of a VA-$MoS_2$—Si heterostructure photodiode device intercalated by Cu.
Figure 3:
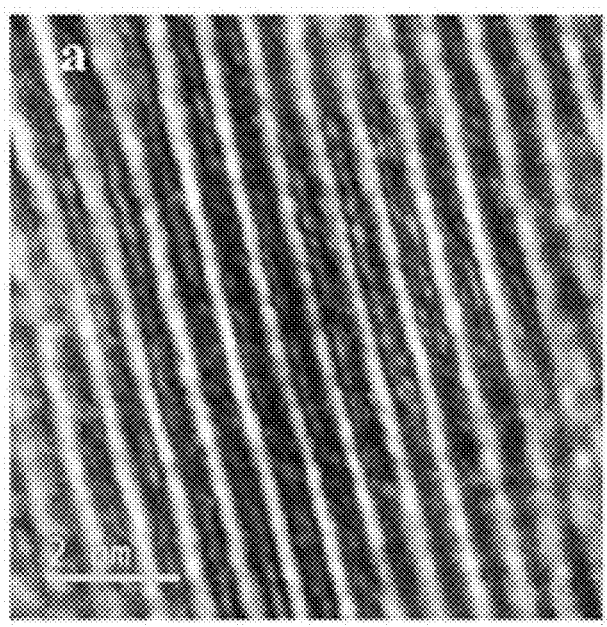
FIG. 3 is an HRTEM image of Cu intercalated $MoS_2$ displaying an additional layer due to intercalation of Cu within the van der Waals (vdW) gaps.
Figure 4:
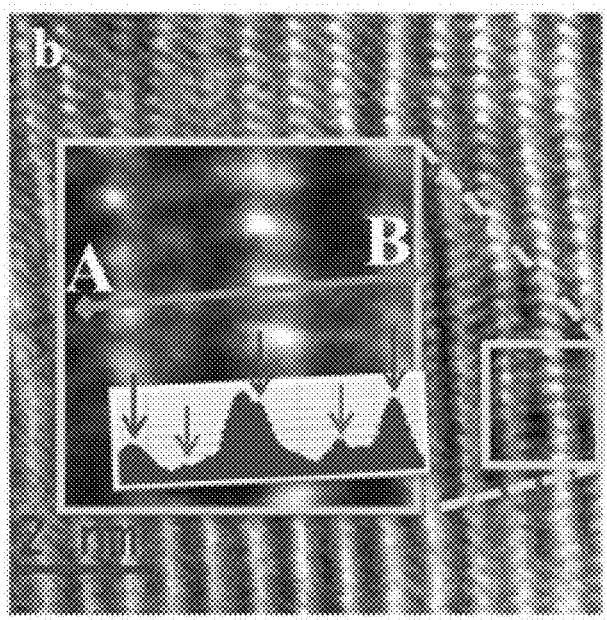
FIG. 4 is a STEM-HAADF image showing a z-contrast image with the inset showing a magnified microscopy image of the area enclosed by the yellow square along with an intensity profile along the AB line in the inset. The layers of Mo atoms appear with higher intensity and the Cu atoms in the between the layers of bright Mo atoms have lower intensity and less brightness.

Cu—$MoS_2$ hybrids were prepared by zero-valent intercalation on CVD-grown VA-$MoS_2$ followed by deposition of a top ITO contact, as shown in the graphical illustration of FIG. 1 and the cross-section TEM in FIG. 2. A thin electron transparent lamella of the cross section of the device structure for inspection was prepared by the FIB. The close-packed arrangement of Cu atoms in the $MoS_2$ host and their impact on the structure are characterized by the HRTEM and Raman spectra displayed in FIGS. 3-8. FIG. 3 displays an HRTEM image of $MoS_2$ after intercalation of Cu atoms under the parallel beam illumination condition, showing the presence of fringe contrast coming from parallel sets of planes. The presence of an additional distinct layer within the vdW gap of $MoS_2$ suggests that Cu atoms organize in close packing within the vdW space. The slight distortion of the layer planes as shown in FIGS. 3 and 4 are suggestive of some islanding of the Cu within the host, consistent with a Daumas-Herold mechanism of intercalation. The average interplanar spacing is found to be greater than the expected interplanar spacing for regular, intercalation-free $MoS_2$, as seen from the distribution and mean value of the measured interlayer fringe spacing in FIG. 6. The average fringe spacing in the intercalated sample increases from 0.6309 nm to 0.6458 nm, an increase of 0.0149 nm. This layer expansion of 2.3% is significant and points to a substantial expansion of the $MoS_2$ interlayer spacing due to Cu intercalation.

Figure 5:
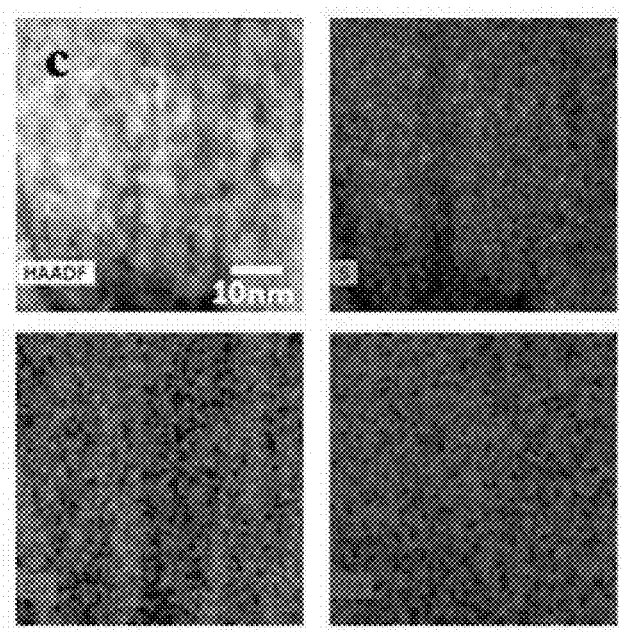
FIG. 5 is a high-angle annular dark-field scanning transmission electron microscopy (STEM-HAADF) image along with elemental distribution maps collected from the energy-dispersive X-ray spectrum (EDX) mapping. S is green, Cu is purple, and Mo is red.
Figure 6:
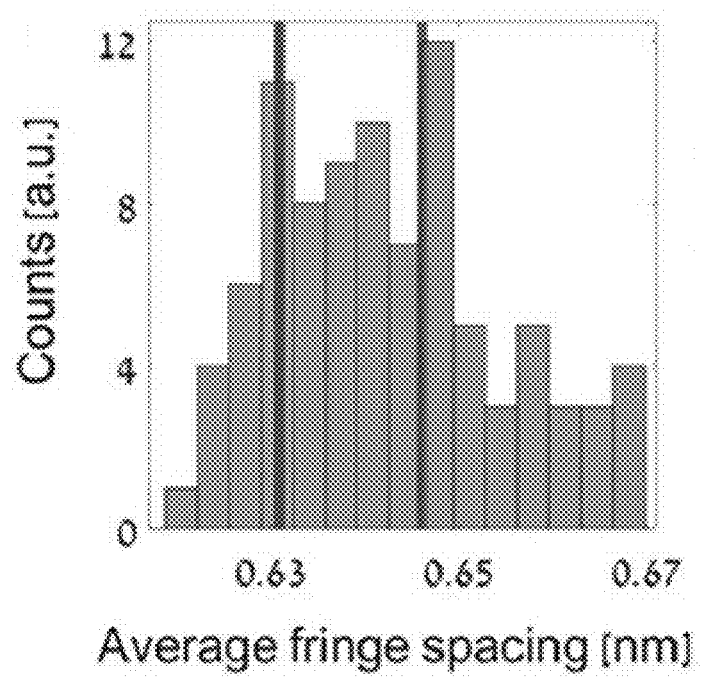
FIG. 6 is a graph showing the distribution and mean value of interlayer spacing between VA-$MoS_2$ planes before and after Cu intercalation. The blue line represents before intercalation and the green line represents after intercalation.
Figure 7:
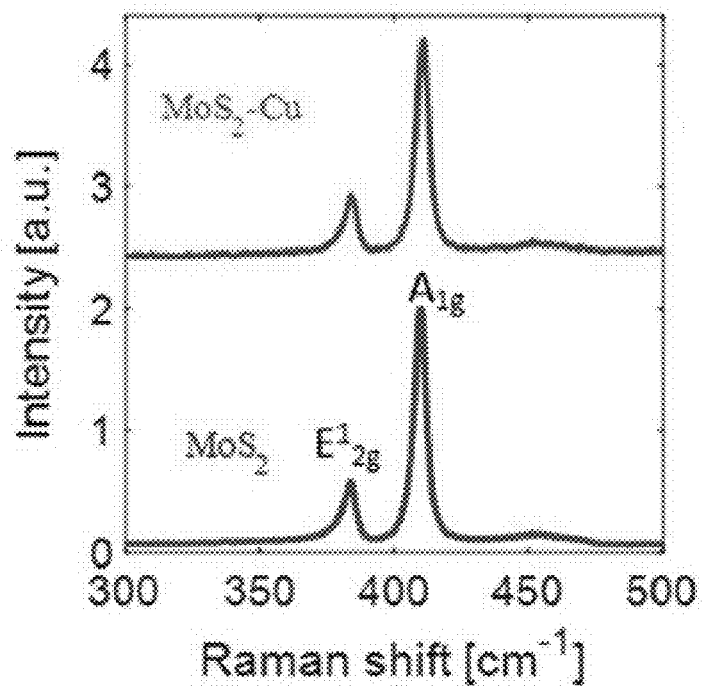
FIG. 7 displays Raman spectra of 2H-$MoS_2$ structure before and after Cu intercalation. Before intercalation is represented by the blue spectrum and after intercalation is represented by the green spectrum.
Figure 9:
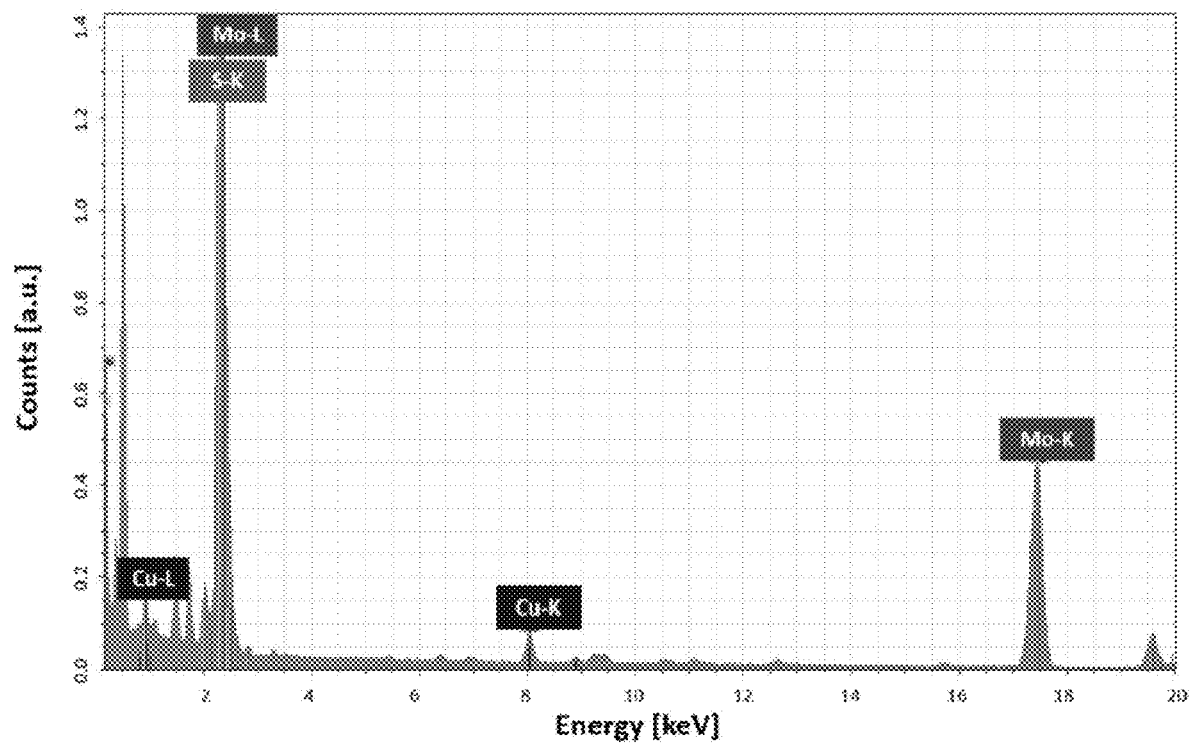
FIG. 9 is an EDS spectrum from energy dispersive spectra mapping of S, Mo, and Cu. The sample was mounted on a Mo grid.

This expansion is illustrated in the high-magnification images in FIGS. 3 and 4 which show the presence of an additional plane between consecutive $MoS_2$ (0002) planes. FIG. 5 shows a STEM-HAADF (high-angle annular dark field) image of a small region within the intercalated VA-$MoS_2$ sample and its corresponding-colored TEM EDX mapping of Cu. Cu is found to be distributed throughout the host material. The presence of Cu in $MoS_2$ is further confirmed from the Cu peaks seen in the EDS spectra acquired from the regions shown in FIG. 5. The EDS spectra is shown in FIG. 9. The Cu concentration is found to be about 11 atomic percent, yielding a stoichiometry of $Cu_{0.11} MoS_2$.

Figure 8:
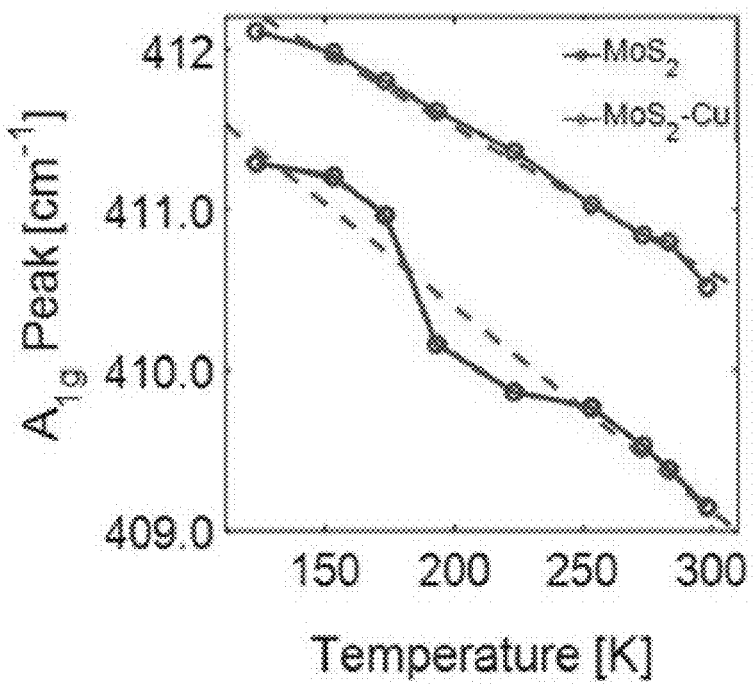
FIG. 8 is a graph displaying the temperature-dependent evolution of the peak $A_{1g}$ Raman mode of $MoS_2$ before and after Cu intercalation. Before intercalation data points are in blue and after intercalation data points are in green.

After Cu intercalation, there are more conductive atoms within the host $MoS_2$ structure to enhance the electrical and optical properties. Raman spectra taken before and after intercalation show small differences as demonstrated in FIG. 7. Spectra taken at a parallel geometry between the laser line and the c-axis of the crystal with linearly polarized light display the expected modes of $MoS_2$ in the original prismatic 2H phase, including an $E^1_{2g}$ mode at approximately 383 $cm^{-1}$ that corresponds to an in-plane stretch and an $A_{1g}$ mode at approximately 410 cm-1 that corresponds to an out-of-plane breathing mode. With intercalation of Cu, $MoS_2$ Raman modes show stiffening with an increase of approximately 2 $cm^{-1}$ for the $A_{1g}$ mode as shown in FIG. 8. The increase in the Raman wavenumber shift with intercalation is consistent with optical phonon stiffening. The thermal coefficient of the $A_{1g}$ mode of base $MoS_2$ is 0.0127 $cm^{-1}K^{-1}$ as expected and the thermal coefficient of the Cu intercalated samples is 0.0091 $cm^{-1}K_{-1}$ which is about 28% lower than the pristine $MoS_2$. The measured thermal conductivity decreases proportionally after the intercalation.

Example 2—DFT Calculations of Cu Intercalated $MoS_2$

Figure 10:
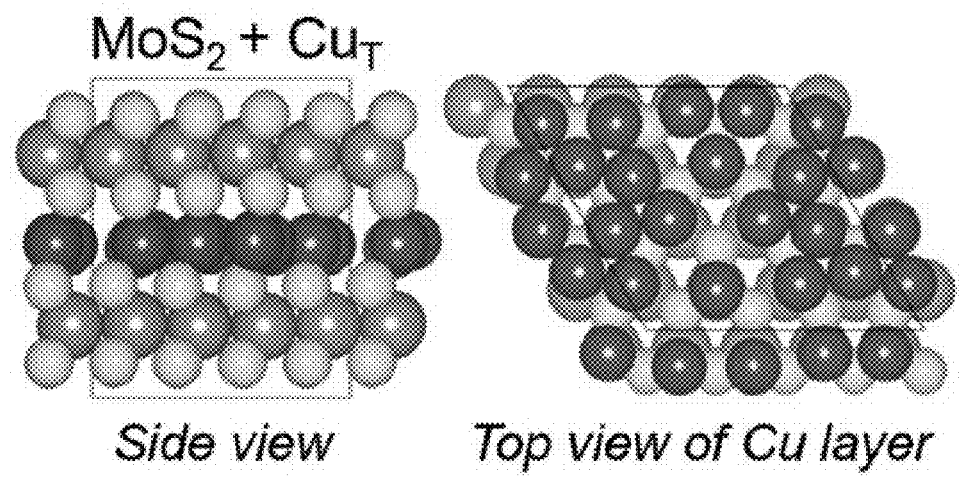
FIG. 10 depicts a structural model of a partial Cu layer ($CU_T$) intercalated within a single vdW gap of bulk $MoS_2$.

DFT calculations were performed to gain insight into the structural and electronic properties of the Cu-intercalated $MoS_2$ structures. At low concentrations, intercalated Cu atoms bind to basal-plane sulfur atoms and are tetrahedrally coordinated. With increasing concentration, the Cu atoms tend to cluster spontaneously within the vdW gap as shown in FIG. 10, ultimately forming slightly corrugated Cu (111) monolayers as illustrated in FIG. 11. This computationally derived picture agreed with the experimental results in FIGS. 3 and 4 wherein partial to complete layers of Cu intercalated within the $MoS_2$ vdW gap was observed.

The driving force for clustering can be quantified by the energetic cost of Cu intercalation per atom, $E_{int}$, defined in Formula (I):

$$E_{int} = \frac{1}{n_x}\left(E_{Cu_x} - E_{MoS_2} - n_x E_{Cu,bulk}\right) \quad (I)$$

As seen in FIG. 12, the intercalation energy progressively decreased with increasing Cu intercalation, going from nearly 0.63 eV per atom for a single Cu atom to about 0.12 eV per atom for a complete monolayer. $CU_T$ represents clustered Cu atoms while $Cu_{ML}$ represents a Cu monolayer. Without being limited to any one particular theory, when Cu is intercalated into the vdW gap, there is an energetic cost associated with expanding the gap to accommodate the Cu atoms as well as an energetic cost associated with activating the fully coordinated, inert basal plane S atoms to form Cu—S bonds. Thus, intercalation energy is initially high. With progressive Cu intercalation, the cost of destabilizing the vdW interaction between $MoS_2$ layers is partially compensated by interactions between clusters of Cu atoms and the $MoS_2$ layers. As Cu atoms begin to cluster, the number of Cu—S bonds are reduced and the S atoms of the $MoS_2$ basal planes are less destabilized, the ultimate limit of a cluster is a complete Cu (111) monolayer, which has weak chemical interactions with the $MoS_2$ layers, but has significant charge-transfer interactions.

As depicted in FIG. 12, the systematic expansion of interlayer spacing was calculated as 6.17 Å in pristine $MoS_2$ to 7.14 Å for intercalation of a Cu monolayer. This calculated expansion is larger than the observed expansion because DFT models allow for complete relaxation of the structure whereas, in practice the VS-$MoS_2$ layers are confined by the Si substrate.

The electronic structures and optical properties of the $Cu_xMoS_2$ models are displayed in FIGS. 13 and 14. As shown in FIG. 13, the intercalated Cu introduced electronic states near the conduction band edge of $MoS_2$ and shifted the Fermi level close to the conduction band edge (n doping). At lower concentrations of intercalated Cu, associated with small clusters and some degree of Cu—S bonding, these additional electronic states formed a broad continuum near the conduction band edge. Once the intercalated Cu formed a complete monolayer, these additional states appeared as sharp resonances within the MoS2 bandgap. The calculated EELS spectrum in FIG. 14 revealed the emergence of a new plasmonic peak at approximately 1.1 eV in the Cu-monolayer intercalated structures ($MoS_2+Cu_{ML}$ model). This plasmon peak is not present in bulk $MoS_2$ or in a Cu (111) monolayer, and is unique to the intercalated structure. Moreover, this sharp plasmon peak is not present in the partially intercalated structure ($MoS_2+CU_T$), which only displayed an overall enhancement in the EELS in the low energy range, shown in the inset of FIG. 14. The sharp plasmonic feature in the fully intercalated structure is attributed to optical transitions involving the numerous resonant gap states seen in FIG. 13. As the actual VA-$MoS_2$ samples consist of regions of complete, partial, or no Cu intercalation, the measured low energy EELS spectrum was expected to reflect a weighted average of the calculated spectra from the partial and fully intercalated samples.

Example 3—Cu Intercalated MoS$_2$ Photodiodes

In order to examine the optoelectronic activity of Cu intercalated MoS$_2$, a photodiode was fabricated on a Si substrate as shown in FIGS. 1 and 2. FIG. 1 displays a schematic representation of a Cu intercalated VA-MoS$_2$—Si heterostructure photodiode that comprises a Pd back contact to a Si substrate and an ITO top contact. Cu is represented by red atoms, MoS$_2$ is represented by yellow and black atoms, and the Si substrate is light blue. A cross-sectional TEM image of the device structure is shown in FIG. 2. The microscopy image clearly shows demarcations between the different layers present in the device structure: a layer of protective platinum on the top, which was deposited during the FIB sample preparation, followed by a layer of ITO, followed by the active layer of 70 nm VA-MoS$_2$ grown on the Si substrate.

FIG. 15 displays the measured low-loss EELS spectra from the Cu intercalated MoS$_2$ photodiode which revealed the emergence of new plasmonic peaks as predicted by the DFT calculations. The measured EELS spectrum displayed three distinct peaks corresponding to: a) a hybrid MoS$_2$—Cu excitation at approximately 1.3 eV in correspondence with the MoS$_2$+Cu$_{ML}$ model; b) a smaller peak at approximately 2 eV in correspondence with the MoS$_2$+Cu$_T$ model; and c) a broad peak at approximately 3.5 eV corresponding to the bare MoS$_2$, indicating that the intercalated Cu organizes within the vdW gap of MoS$_2$ in large (nearly continuous) domains as well as smaller patches. Intercalation, in general, can result in new EELS peaks from the appearance of new surface plasmons, bulk plasmons, or interband transitions.

The total absorbance of the devices is displayed in FIG. 16. The MoS$_2$ device had optical absorptions between 20 to 50% over the range of 0.7 to 1.1 μm wavelengths, respectively. Cu intercalation further enhanced the NIR absorption of the device up to approximately 60%. The photoresponse and photocurrent (at 850 nm) of VA-MoS$_2$ and Cu-intercalated VA-MoS$_2$ are displayed in FIG. 17 and FIG. 18, respectively. The responsivity of the MoS$_2$ diode peaked at approximately 66 A/W whereas the responsivity of the Cu intercalated device peaked at approximately 500 A/W. Remarkably, intercalation of Cu improved the responsivity of the photodiode by an order of magnitude, as shown in FIG. 18. over a wide spectral range of about 0.5 μm to 1.1 μm. At greater light intensities, the responsivity of the Cu intercalated device decayed, but still remained higher than that of the unintercalated device by a factor of three, as shown in FIG. 17.

The spectral response displayed in FIG. 18 and the absorbance are related to the internal quantum efficiency (IQE), η$_i$, by the relation $$\eta_i(\lambda) = \frac{R(\lambda)hc}{\lambda \rho(\lambda)},$$

where λ is the wavelength of incident light, h is Planck's constant, c is the speed of light, and ρ(λ) is the absorbance;

$$R(\lambda) = \frac{I_{ph}(\lambda)}{P(\lambda)}$$

is the spectral responsivity, where I$_{ph}$(λ) is the photocurrent, and P(λ) is the power spectrum. Since the upper bound of IQE is 1, the excess of electrons collected per photon is attributed to a photoconductive gain. The gain as shown in FIG. 19 at the 0.7 μm to 1.1 μm wavelength range attained peak values of approximately 1000 for the pristine MoS$_2$ device and approximately 10,000 for the Cu intercalated device. The high gain is attributed to defects in VA-MoS$_2$ that trap electrons for durations that are longer than the transit time of holes.

The maximum photoresponsivity was 4.2×10$^4$ for the Cu intercalated VA-MoS$_2$ photodiode and 8.2×10$^3$ and for the VA-MoS$_2$ photodiode. The broad spectral response featured high average values of 161 A/W before and 830 A/W after Cu intercalation, featuring a plateau in the spectral range of 500 to 847 nm, as shown in FIG. 18. The photoresponse enhancement is attributed to the efficient ionization of zero-valent Cu by photocarriers.

This enhancement can be technologically beneficial for night-vision image intensifiers, working at low-light levels. Traditionally, image intensifiers are based on intensifying tubes that convert scene photons to electrons on a photocathode; the electrons are multiplied via a multi-channel plate (MCP) and are accelerated to produce an enhanced image of the scene on a phosphorus screen. Intercalation-enhanced photodetectors are a good candidate technology for the core elements of visible to NIR image intensifiers, replacing bulky tubes with compact color vision. The high performance within the NIR part of the spectrum could allow for extra imaging capabilities under low-light (photon counting) scenarios, even on moonless nights due to the atmospheric night glow phenomena. In addition, the NIR band is most suitable for imaging and analysis of high vegetation terrain (e.g., forests, agricultural fields).

Example 4—Sn Intercalated MoS$_2$

Zero-valent Sn was intercalated in CVD-grown vertical MoS$_2$. FIG. 20 displays an HRTEM micrograph of MoS$_2$ after intercalation, showing the presence of Sn atoms arranged in layers between the MoS$_2$ planes. The inset provides a guide on the atomistic structure wherein Sn atoms are depicted in red, Mo in green, and S in yellow. The intercalation induced deformations in the crystalline structure are depicted in FIG. 24, which shows the interplanar spacing distribution, and from the contrast map of FIG. 22, that is associated with the yellow marked area in FIG. 21. The average interplanar spacing was found to increase after Sn intercalation from 0.6309 nm to 0.639 nm, which is a total expansion of 1.3%. This expansion is also illustrated in the high-magnification micrograph in FIGS. 20 and 21 that show the presence of an additional plane between two consecutive MoS$_2$ (0002) planes. FIG. 22 presents the integrated contrast from the area enclosed by the yellow rectangle of FIG. 21, showing the average arrangement of Sn within MoS$_2$ layers.

The presence of Sn in MoS$_2$ was further confirmed from the Sn peaks seen in the EDS spectra shown in FIG. 25 acquired from the regions shown in FIG. 22. The Sn concentration was found to be about 3.4+/−0.1 atomic percent, spatially arranged in clusters. EDS spectrum as shown in FIG. 26 also shows the presence of Sn in the MoS$_2$ layer. The Cu signal is noted from the Cu grid used to mount the sample.

FIG. 27 shows Raman spectra taken in parallel orientation of the laser relative to the c-axis of the crystal. The spectra displayed the expected modes of 2H-MoS$_2$ with some stiffening of the A$_{1g}$ mode resulting from intercalation of Sn, consistent with the measured interlayer vdW gap expansion of shown in FIG. 24 and the calculations of FIG. 23. This increase in the Raman wave shift is consistent with optical phonon stiffening. Interestingly, Sn intercalated MoS₂ took a predominant islanding structure. HRTEM confirms the arrangement of Sn in single atom thick islands of 20 nm to 50 nm.

The intercalation energy estimates the driving force for clustering of Sn atoms and results in the trend displayed in FIG. 23. Initially, the relatively large diameter of Sn atoms needs to overcome a sizable diffusion energy barrier in the range of 3.5 eV/atom to penetrate the vdW gap. From this point, for the $n^{th}$ atom in the cluster this energy barrier reduces rapidly, and the intercalation energy is well fitted with $E_{int} \propto A[1-\text{erf}(\alpha n)]+B$, where A, B and α are constants and n is the number of atoms in a Sn cluster, suggesting that the initially high diffusion barrier rapidly decays after an initial "cracking" process of the first few atoms penetrating the vdW gap. Complementarily, most of the c-axis expansion as resulting from the intercalation is affected by the first atom and remains almost unaffected after clustering of four atoms as shown in FIG. 23.

Example 5—DFT Calculations of Sn Intercalated MoS₂

DFT calculations were performed to characterize the structural and electronic properties of Sn-intercalated MoS₂ structures as presented in FIG. 28. FIG. 28 shows an illustration of structural models of (a) a cluster of two Sn atoms ($Sn_{2cluster}$), (b) a cluster of four Sn atoms ($Sn_{4cluster}$) and (c) a Sn monolayer ($Sn_{ML}$) intercalated within a single vdW gap of bulk MoS₂. One of the layers have been removed in the top views to show the intercalated Sn cluster and layer clearly. In (a) and (b), a unit cell is indicated by solid lines; in (c), a MoS₂+$Sn_{ML}$ unit cell consists of a single Sn atom within a vdW gap of 1×1 cell of bulk MoS₂ and a 4×4 supercell of MoS₂+$Sn_{ML}$ is shown for clarity. At low concentrations, intercalated Sn atoms bind to basal-plane sulfur atoms and are tetrahedrally coordinated. With increasing concentration, the Sn atoms tend to cluster spontaneously within the vdW gap.

As shown in FIG. 29, the intercalated Sn introduced electronic states near the conduction band edge of MoS₂ and shifted the Fermi level close to the conduction band edge (n doping). At lower concentrations of intercalated Sn, associated with small clusters and some degree of Sn—S bonding, these additional electronic states formed a broad continuum near the conduction band edge. Once the intercalated Sn formed a complete monolayer, these additional states appeared as sharp resonances within the MoS₂ bandgap.

The impact of Sn intercalation on the optical properties of MoS₂ is characterized by measured and calculated optical absorption as shown in FIGS. 30 and 31. The calculated absorption of bare and intercalated MoS₂ crosses at approximately 1.9 eV, close to the bandgap, while the actual device includes the substrate and top ITO electrode. The measured enhanced absorption is shifted to approximately 1.3 eV. The EELS spectra depicted in FIGS. 32 and 33 show a main peak at approximately 1.9 eV, corresponding to the bulk plasmon of MoS₂. In addition, several weak plasmon lines associated with Sn clusters, depicted as grey dash lines in FIG. 33, appeared consistently in measurements and in DFT calculations as shown in FIG. 32. Interestingly, these lines are absent from the calculated EELS of Sn without MoS₂.

Example 6—Sn Intercalated MoS₂ Photodiodes

In order to examine the optoelectronic activity of Sn intercalated MoS₂, a photodiode was fabricated on a Si substrate as shown in FIGS. 34 and 35. FIG. 34 is a graphical illustration of a cross-section of a VA-MoS₂ heterostructure photodiode device intercalated by Sn. MoS₂ is represented by yellow and black atoms, Sn is represented by grey atoms, and the Si substrate is light blue. FIG. 35 is a bright field TEM micrograph of the cross-section of the Sn intercalated VA-MoS₂ photodiode device structure. The microscopy image clearly shows demarcations between the different layers present in the device structure: a layer of protective platinum on the top, which was deposited during the FIB sample preparation, followed by a layer of ITO, followed by the active layer of VA-MoS₂ grown on a Si substrate.

The monochromatic (850 nm) photocurrent per illumination power and the responsivity of the device was compared between a MoS₂ photodiode and a photodiode of Sn intercalated MoS₂. The results are shown in FIG. 36. The responsivity is the ratio of photocurrent to illumination power, $R=I_{ph}/P_{in}$. The observed trend of the responsivity with respect to the power, shown in FIG. 36, indicates thermal stimulation of the photoresponse.

Similarly, the photoconductive spectral response of the intercalated device, shown in FIG. 37, showed an additional broad peak at about 1.3 μm followed by a broader signature that extended towards the mid infrared. This aligns with the calculated absorption and EELS spectra as depicted in FIGS. 30 and 32. Initially, the MoS₂ device featured a sizable photoconductive gain that can be attributed with the orientation of the crystal and with hot photocarriers generated at shallow defects of dislocations and grain boundaries. This may be attributed to the enhanced photoconductive gain and infrared enhancement to the confined Sn—MoS₂ interface. These hybrid states extend from the band edges of MoS₂, enabling efficient ionization of the metal-hybrid states into the conduction band upon optical generation. Interestingly, a non-monotonic relation of the responsivity with respect to the incident illumination power is observed and shown in FIG. 36, indicating a gain mechanism involving thermal effects, that is fitted with the character of metallic Sn clusters.

Overall, the spectral photoconductive gain displayed in FIG. 38 is the internal quantum efficiency (IQE). Since the upper bound of IQE is 1, the excess of electrons collected per photon is attributed to a photoconductive gain. The gain in the 0.7 μm to 1.1 μm wavelength range attained peak values of approximately 400 for the MoS₂ device and approximately 1400 for the Sn intercalated MoS₂ device. Considering that the response time of the devices is approximately 10 s, and the IR-extended spectral response, the observed photoconductive gain is attributed to impact ionization thermal carriers.

Sn intercalated MoS₂ devices remain semiconducting and maintain the original prismatic 2H phase of MoS₂. Moreover, Sn intercalated MoS₂ devices comprise unique features characterized by the measured photoresponse of the photodiodes. Sn intercalated devices demonstrated a non-monotonic relation of responsivity to incoming power and a spectral extension of the spectral response towards the mid-IR, much beyond the bandgap of non-intercalated MoS₂. Both effects are attributed to enhanced hot photoelectron generation and efficient ionization of semilocalized mid-gap Sn states to the conduction band of the Sn—MoS₂ interface.

The present disclosure is further defined by the following numbered embodiments.

1. A photodetector comprising 2D vertically-aligned MoS₂ (VA-MoS₂) layers, wherein a van der Waals (vdW) gap of at least two layers of the MoS$_2$ is intercalated with one or more transition metal or post-transition metal atoms.

2. The photodetector of embodiment 1, wherein the one or more metal atoms comprise copper (Cu).
3. The photodetector of embodiment 1, wherein the one or more metal atoms comprise tin (Sn).
4. The photodetector of any one of embodiments 1-3, wherein all MoS$_2$ layers are intercalated with one or more metal atoms.
5. The photodetector of any one of embodiments 1-4, wherein the intercalated metal atoms comprise clusters of at least 2 atoms.
6. The photodetector of any one of embodiments 1-5, wherein the intercalated metal atoms comprise islands of metal atoms.
7. The photodetector of any one of embodiments 1-6, wherein the intercalated metal atoms comprise islands of about 20 nm to about 50 nm.
8. The photodetector of any one of embodiments 1-7, wherein the intercalated metal atoms comprise a monolayer.
9. The photodetector of any one of embodiments 1-8, wherein the intercalated metal atoms form clusters of at least 2 atoms and monolayers.
10. The photodetector of any one of embodiments 1-9, wherein the intercalated metal atoms comprise a planar monolayer.
11. The photodetector of any one of embodiments 1-10, wherein the photodetector comprises a phototransistor, a photodiode, and/or a photoconductor.
12. The photodetector of any one of embodiments 1-11, wherein the photodetector is a photodiode.
13. A method of photodetection comprising the photodetector of any one of embodiments 1-12.
14. The method of embodiment 13, wherein the intercalated atom introduces electronic states near the conduction band of the MoS$_2$ and shift the Fermi level close to the conduction band edge.
15. The method of any one of embodiments 13-14, wherein the intercalated atom comprises Cu, and wherein a photoresponse comprises a plasmonic resonance at an energy of about 1 eV to about 1.3 eV.
16. The method of any one of embodiments 13-15, wherein the intercalated atom comprises Cu, and wherein a photoresponse comprises a plasmonic resonance at an energy of about 2 eV.
17. The method of any one of embodiments 13-16, wherein the intercalated atom comprises Cu and wherein a photodetection comprises a near infrared (NIR) absorption of about 20% to about 60%.
18. The method of any one of embodiments 13-17, wherein the intercalated atom comprises Cu and wherein a photodetection comprises a photoresponsivity of about an order of magnitude higher than a MoS$_2$ photodiode without intercalation over a spectral range of about 0.5 µm to about 1.1 µm.
19. The method of any one of embodiments 13-18, wherein the intercalated atom comprises Cu, and wherein a photodetection comprises a photoresponsivity over a broad spectral range with a maximum value of about 1×10$^4$ A/W to about 5×10$^4$ A/W.
20. The method of any one of embodiments 13-14, wherein the intercalated atom comprises Sn and wherein a photoresponse comprises one or more plasmonic resonance at an energy of about 1.5 eV to about 1.8 eV.

21. The method of embodiment 20, wherein the intercalated atom comprises Sn, and wherein a photodetection comprises a near infrared (NIR) absorption of up to about 70%.
22. The method of any one of embodiments 20-21, wherein the intercalated atom comprises Sn, and wherein the photodetection comprises an enhanced photoresponsivity higher than a MoS$_2$ photodiode without intercalation over a spectral range of about 0.5 µm to about 1.1 µm.
23. The method of any one of embodiments 13-22, wherein the photoresponse comprises a broad spectral response that extends into the NIR spectrum.
24. The method of any one of embodiments 13-23, wherein the method is performed in low-light conditions.
25. The method of any one of embodiments 13-24, wherein the method is performed at night.
26. The method of any one of embodiments 13-25, wherein the method is performed in high vegetation terrain.
27. The photodetector of any one of embodiments 1-12, wherein the photodetector is a part of a night-vision image intensifier.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A photodetector comprising 2D vertically-aligned MoS$_2$ (VA-MoS$_2$) layers, wherein a van der Waals (vdW) gap of at least two layers of the MoS$_2$ is intercalated with one or more transition metal or post-transition metal atoms.
2. The photodetector of claim 1, wherein the one or more metal atoms comprise copper (Cu) and/or tin (Sn).
3. The photodetector of claim 1, wherein all MoS$_2$ layers are intercalated with one or more metal atoms.
4. The photodetector of claim 1, wherein the intercalated metal atoms comprise clusters of at least 2 atoms.
5. The photodetector of claim 1, wherein the intercalated metal atoms comprise islands of about 20 nm to about 50 nm.
6. The photodetector of claim 1, wherein the intercalated metal atoms comprise a monolayer.
7. The photodetector of claim 1, wherein the intercalated metal atoms form clusters of at least 2 atoms and monolayers.
8. The photodetector of claim 1, wherein the photodetector comprises a phototransistor, a photodiode, and/or a photoconductor.
9. The photodetector of claim 1, wherein the photodetector is a part of a night-vision image intensifier.
10. A method of photodetection comprising:
obtaining the photodetector of claim 1; and
detecting a photoresponse.
11. The method of claim 10, wherein the intercalated atom introduces electronic states near the conduction band of the MoS$_2$ and shift the Fermi level close to the conduction band edge.
12. The method of claim 10, wherein the intercalated atom comprises Cu, and wherein the photoresponse comprises a plasmonic resonance at an energy of about 1 eV to about 1.3 eV and/or a plasmonic resonance at an energy of about 2 eV.

13. The method of claim 10, wherein the intercalated atom comprises Cu and wherein the method results in a photodetection comprising a near infrared (NIR) absorption of about 20% to about 60%.

14. The method of claim 10, wherein the intercalated atom comprises Cu and wherein the method results in a photodetection comprising a photoresponsivity of about an order of magnitude higher than a $MoS_2$ photodiode without intercalation over a spectral range of about 0.5 μm to about 1.1 μm.

15. The method of claim 10, wherein the intercalated atom comprises Cu, and wherein the method results in a photodetection comprising a photoresponsivity over a broad spectral range with a maximum value of about $1 \times 10^4$ A/W to about $5 \times 10^4$ A/W.

16. The method of claim 10, wherein the intercalated atom comprises Sn and wherein the photoresponse comprises one or more plasmonic resonance at an energy of about 1.5 eV to about 1.8 eV.

17. The method of claim 10, wherein the intercalated atom comprises Sn, and wherein the method results in a photodetection comprising a near infrared (NIR) absorption of up to about 70%.

18. The method of claim 10, wherein the intercalated atom comprises Sn, and wherein the method results in a photodetection comprising an enhanced photoresponsivity higher than a $MoS_2$ photodiode without intercalation over a spectral range of about 0.5 μm to about 1.1 μm.

19. The method of claim 10, wherein the photoresponse comprises a broad spectral response that extends into the NIR spectrum.

20. The method of claim 10, wherein the method is performed in low-light conditions and/or at night and/or in high vegetation terrain.

* * * * *